United States Patent [19]  
Smith et al.

[11] 3,844,422  
[45] Oct. 29, 1974

[54] PALLET LOADING MACHINE

[76] Inventors: Irwin Donald Smith, 1066 Chantilly Rd., Bel Air; Thomas W. Tull, 4065 Kraft Ave., North Hollywood, both of Calif.; Frank W. Fenton, 5637 Fremont Ln., St. Louis, Mo. 63129

[22] Filed: Feb. 4, 1972

[21] Appl. No.: 223,730

Related U.S. Application Data

[63] Continuation of Ser. No. 888,499, Dec. 29, 1969, abandoned.

[52] U.S. Cl. .............. 214/6 P, 214/6 H, 214/8.5 F
[51] Int. Cl. ............................................ B65g 57/24
[58] Field of Search ................. 198/221, 222, 107; 214/6 P, 6 H, 6 DK, 6 A, 6 G, 8.5

[56] References Cited
UNITED STATES PATENTS

| | | | |
|---|---|---|---|
| 2,409,513 | 10/1946 | Patience et al. | 198/222 |
| 2,769,558 | 11/1956 | Ehlers | 214/6 P |
| 3,050,199 | 8/1962 | McGrath et al. | 214/6 P |
| 3,231,100 | 1/1966 | Faeber | 214/6 S |
| 3,442,401 | 5/1969 | Wolfe et al. | 214/6 P |
| 3,520,422 | 7/1970 | Bruce et al. | 214/6 P |
| 3,522,890 | 8/1970 | Birchall | 214/6 P |
| 3,566,576 | 3/1971 | Ayres et al. | 214/6 P |

FOREIGN PATENTS OR APPLICATIONS

| | | | |
|---|---|---|---|
| 1,214,155 | 7/1966 | Germany | 214/6 P |
| 835,239 | 5/1960 | Great Britain | 214/6 P |
| 1,444,118 | 5/1966 | France | 214/6 P |

*Primary Examiner*—Robert J. Spar  
*Assistant Examiner*—Leslie J. Paperner  
*Attorney, Agent, or Firm*—Ralph W. Kalish

[57] ABSTRACT

A pallet loading machine having means for simultaneous delivery of a plurality of cartons or cases in side-by-side and end-to-end relationship for immediate, rapid layer formation, carriage means for effecting transfer of a formed layer to a pattern plate, means for delivering an empty pallet immediately beneath the pattern plate from the top of a stock of empty pallets to elevator arms, means for removing said pattern plate from beneath the formed layer for descent of the latter onto the pallet therebeneath, means for vertically descending said elevator arms during pallet loading operation, and means for retracting said elevator arms from a fully loaded pallet for returning said arms during discharge of the loaded pallet from the machine to uppermost position for receiving an empty pallet for subsequent loading.

3 Claims, 26 Drawing Figures

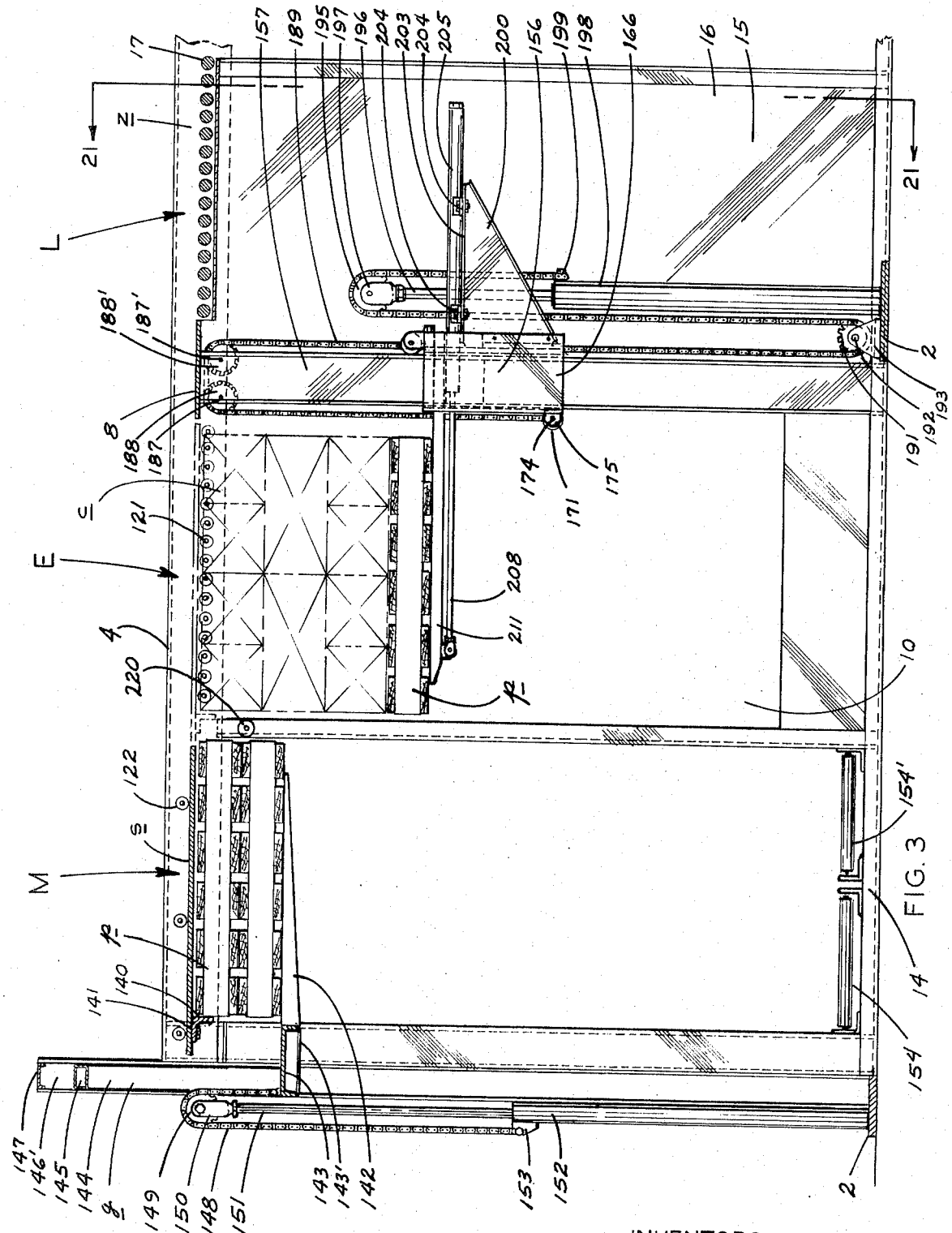

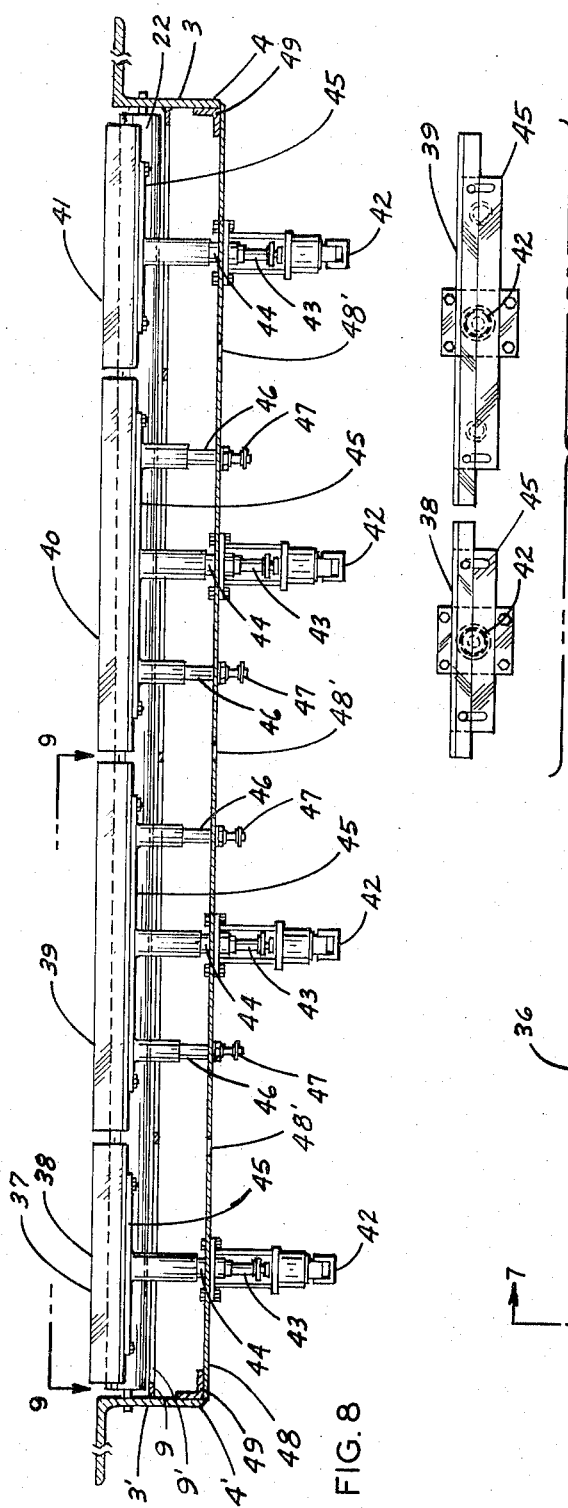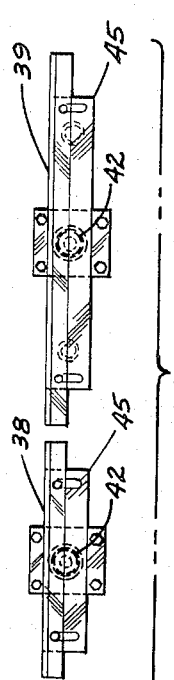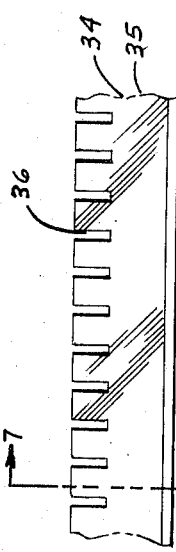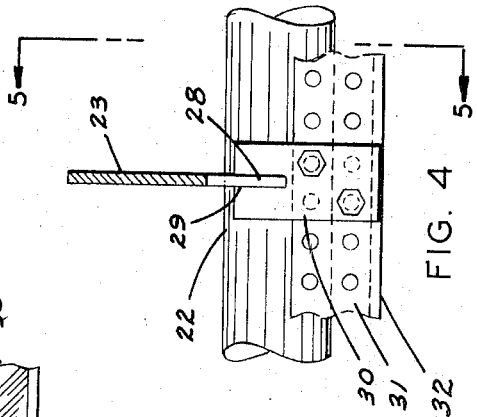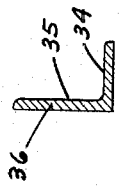

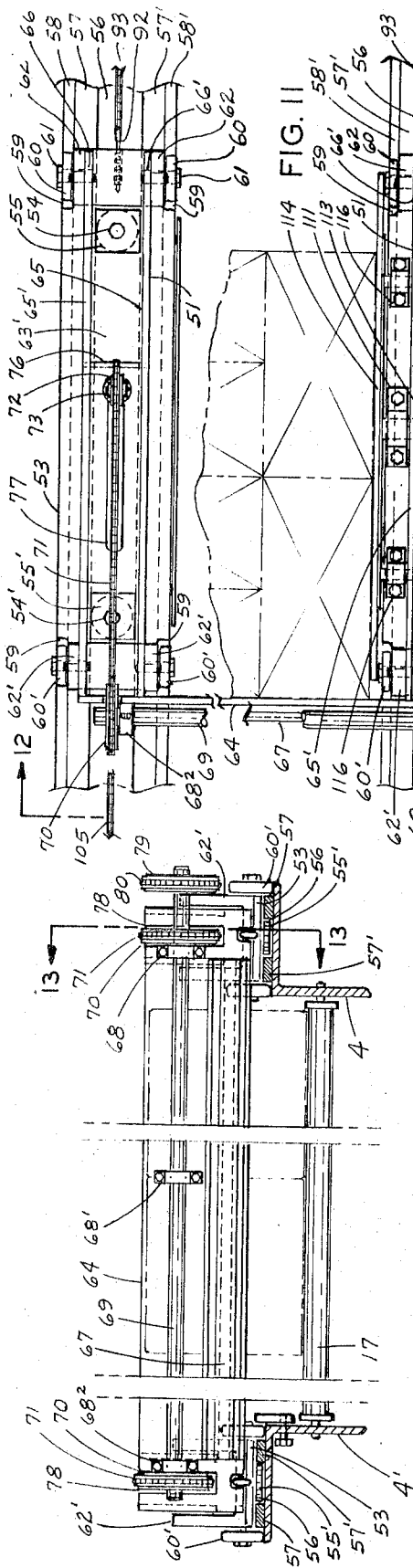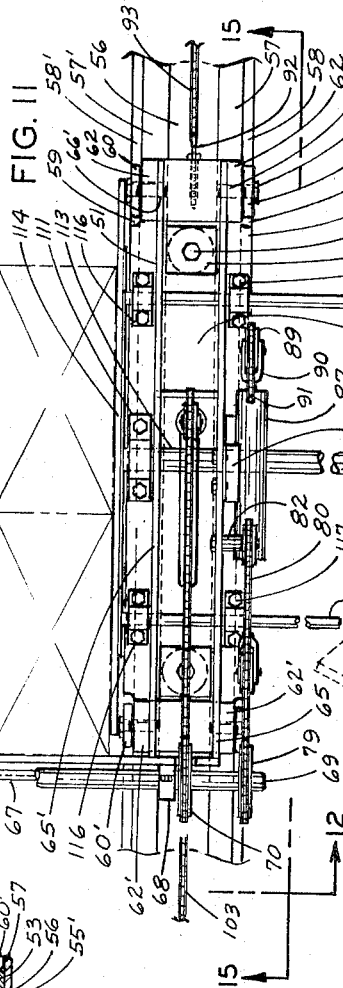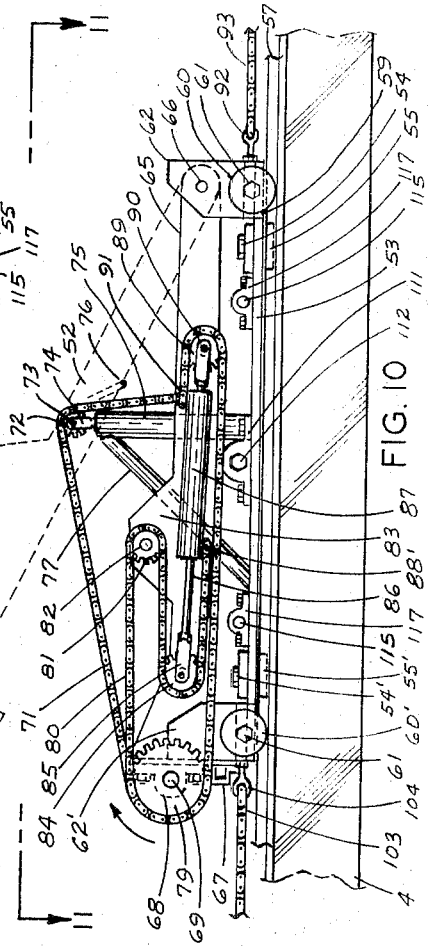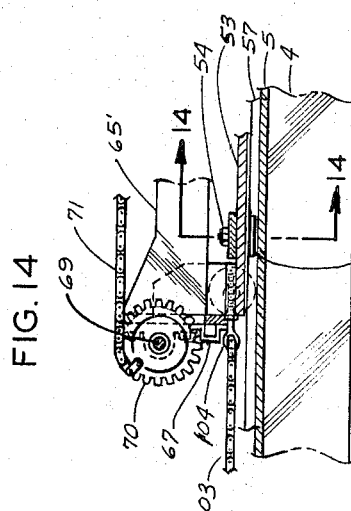

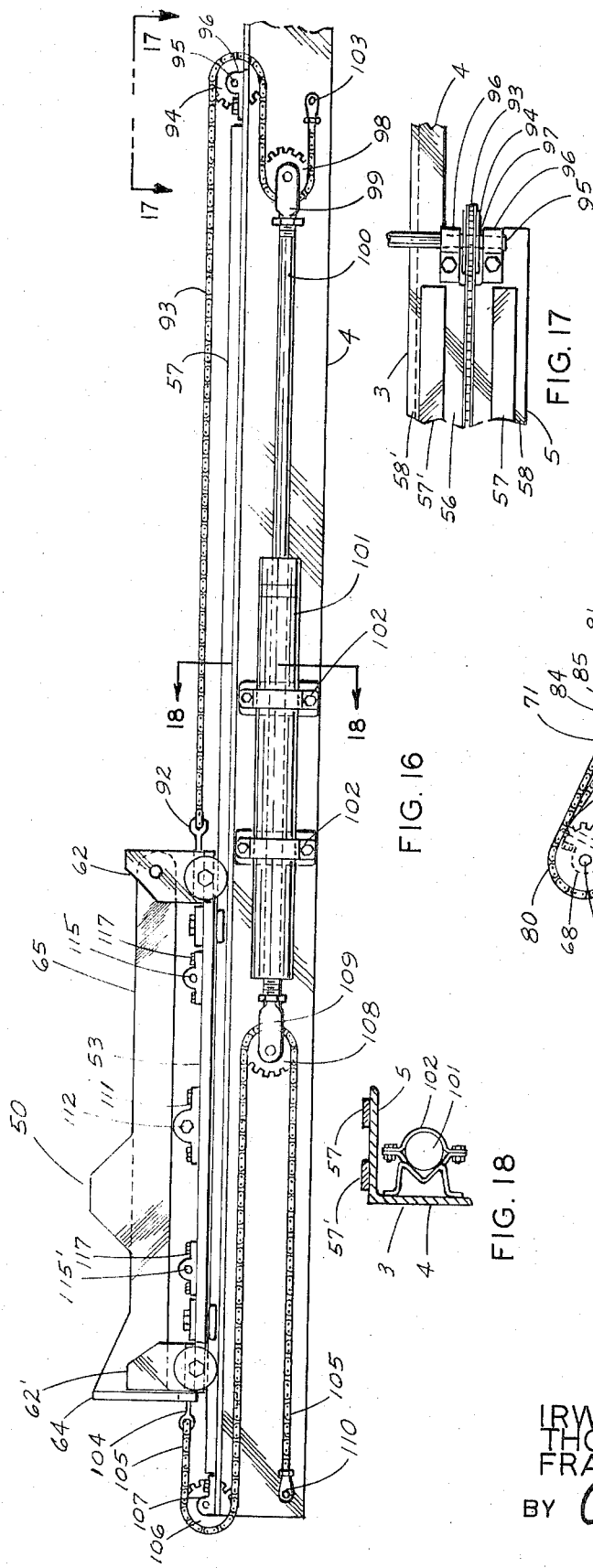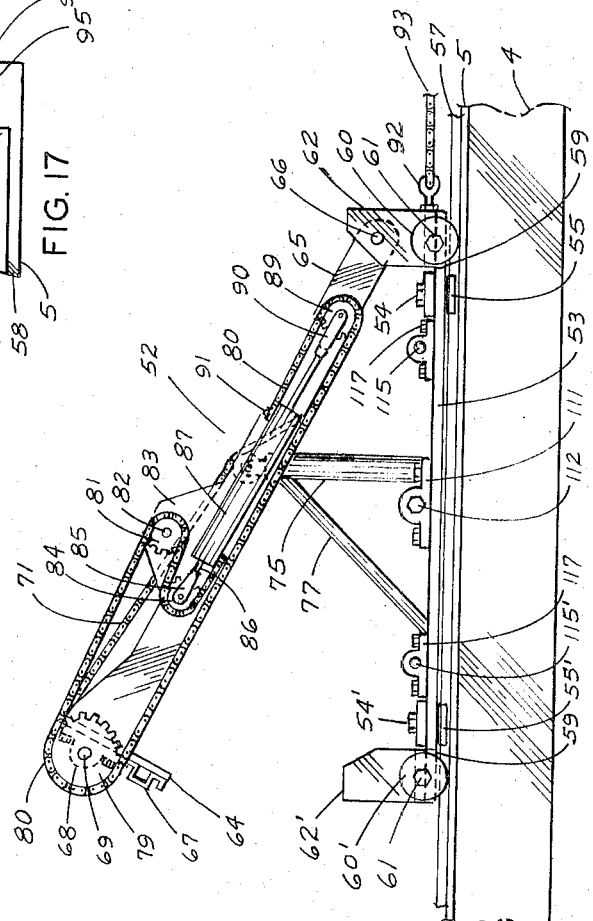

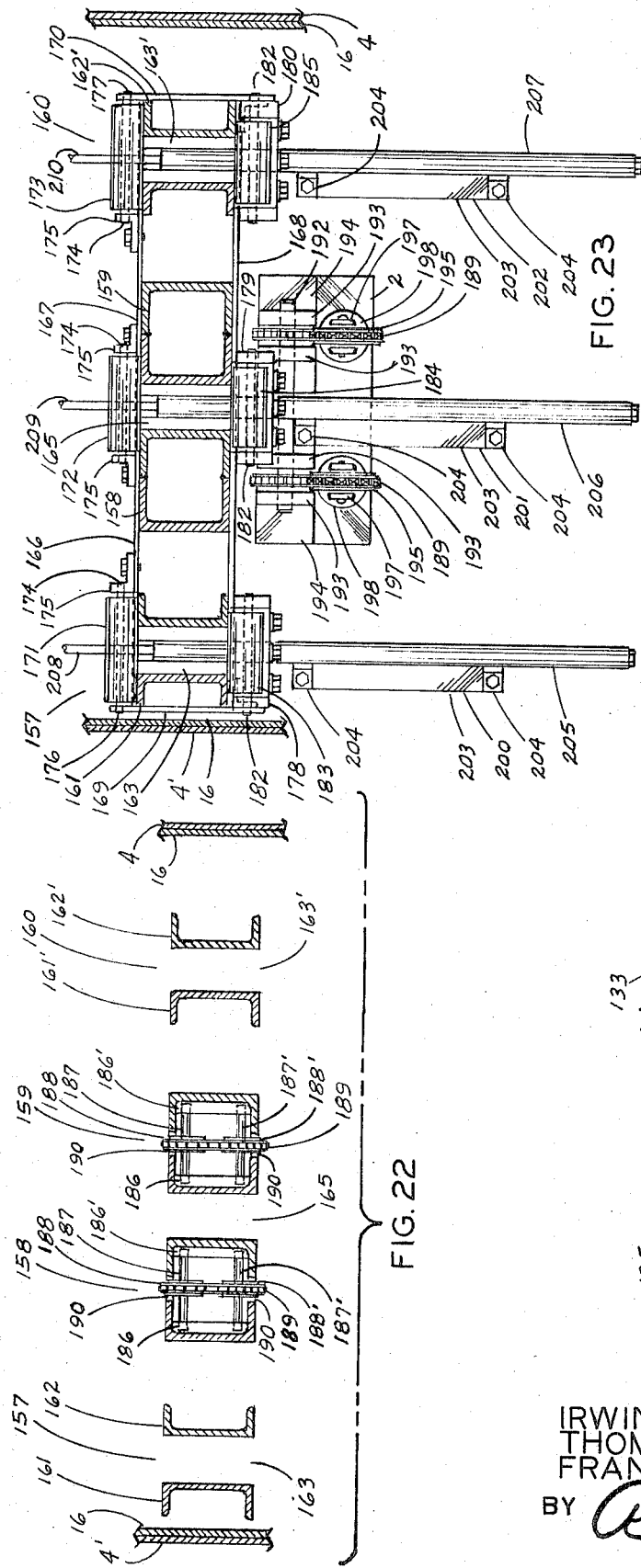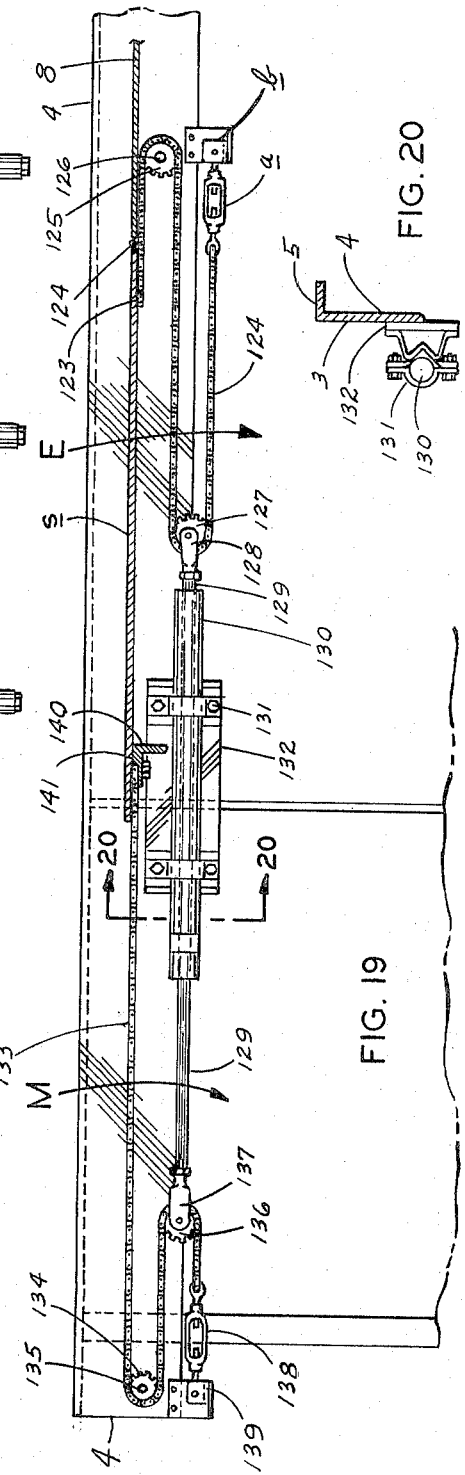

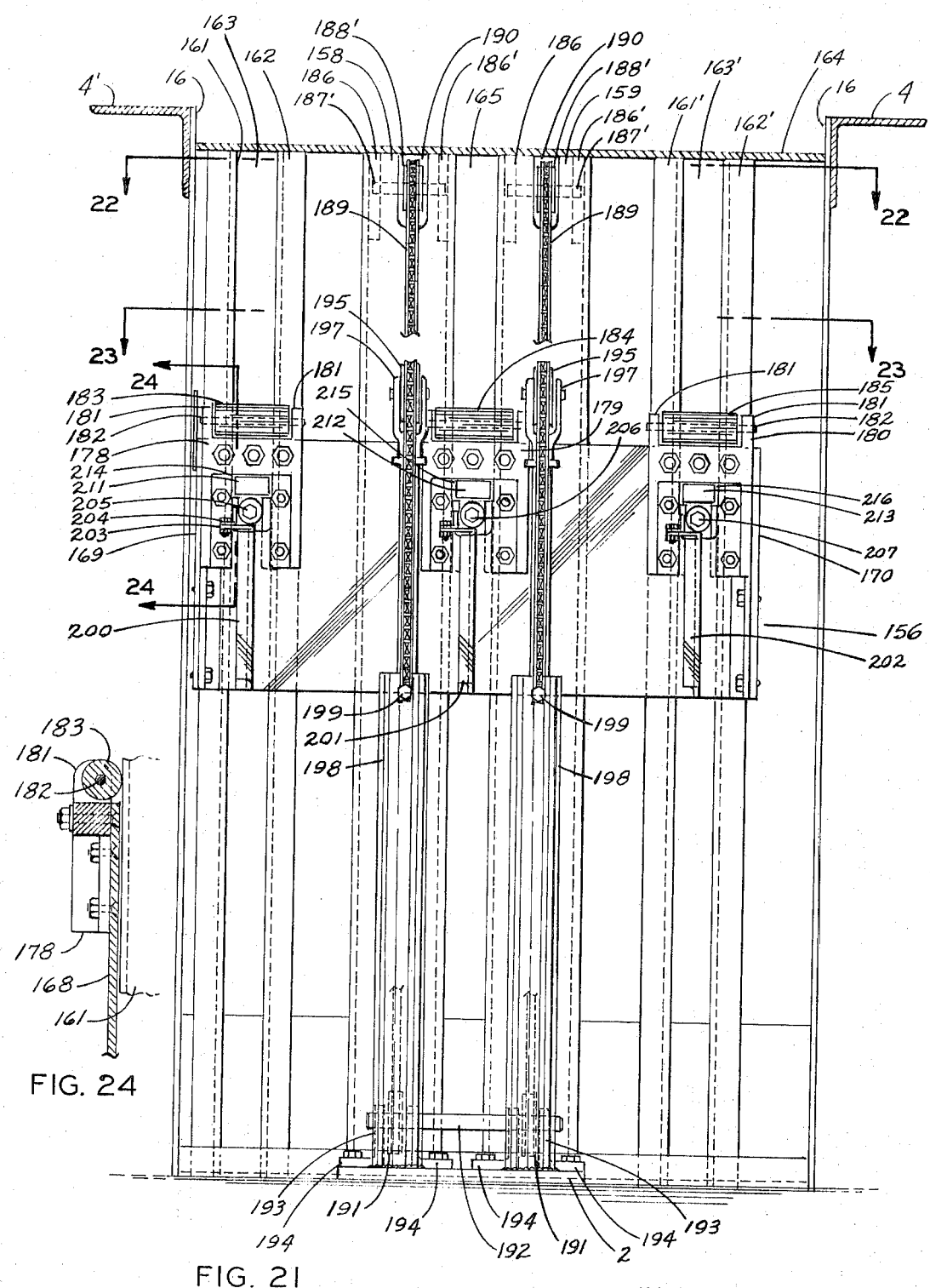

PALLET LOADING MACHINE

This is a continuation of application Ser. No. 888,499, filed Dec. 29, 1969 now abandoned.

BACKGROUND AND SUMMARY OF THE INVENTION

This invention relates in general to materials handling equipment and, more particularly, to a pallet loading machine.

Heretofore, although numerous machines for automatically loading a pallet with cartons, cases, bags, or like units in a stacked or tiered manner have been known, there has been a continual need for developing machines of this type for increased rapidity of operation, that is, in terms of the number of cartons or cases loaded per minute. However, despite this generally recognized need to enhance loading speed, pallet loading machines to the present time have substantially conformed to a basic prototype wherein the cartons or cases are individually delivered to the machine for initial row formation, with such row being then rammed or otherwise transmitted to an accumulation area dimensioned to accept in sequence a predetermined number of rows for layer development. Thereupon the formed layer is transferred to a so-called stripper or pattern plate which, upon operation, permits gravitational descent of the layer onto the pallet to be loaded. In order to stabilize a multi-tiered or layered load the layers must be so constituted as to effect an interlock. Various carton or case-turning devices with relatively complex components, have been incorporated within such machines so as to effect the necessary turning to produce layers of alternating character to bring about the interlocked load. Carton turning devices of this character are disclosed in U.S. Pat. Nos. 2,699,264; 2,701,650; 2,703,182; 2,815,870; and 2,947,405 and others. In order to achieve a suitable interlock of the load, certain machines have embodied systems for effecting a predetermined spacing between certain cartons of each layer. It will be recognized that utilization of apparatus for carton turning and/or carton spacing presents a serious potential breakdown or malfunction with ultimate resulting down-time for the related machine. Such carton turning inherently requires an increment of time which adversely affects the overall speed of the loading operation. Admittedly, the presentation of the cartons individually or singly to the machine as well as the necessary time consumption in ramming a row of cartons to an accumulation area does bring about further unavoidable deterrents to rapid operation.

Pallet loading machines of the general type under discussion customarily include an empty pallet magazine with a system for delivering the lowermost pallet from such magazine and requiring the elevation of the same to initial layer-receiving, loading position; which travel as well presents a heretofore accepted time consuming operation.

Thus, generally pallet loading machines have followed the above outlined basic construction and with the efforts to accelerate the operation of the same being directed to modifications in the electrical systems for promoting a faster reactive time rather than making efforts to modify certain of the fundamental individual operations of the machine.

Therefore, it is an object of the present invention to provide a pallet loading machine which is adapted for marked rapidity of pallet loading and incorporates means for simultaneously delivering a plurality of cartons, cases, or the like to a layer forming area as contradistinguished from a sequential row-by-row delivery.

It is another object of the present invention to provide a pallet loading machine having carton or case delivery means adapted for division into a multiplicity of discrete carton travel paths whereby a plurality of cartons in side-by-side relationship are conveyed to an accumulation or layer-forming zone, and with means for readily adjusting the transverse extends of said travel paths so as to render the machine capable of accommodating a variety of sizes of stackable units and as well as to permit the individual cartons, cases, or units to be transmitted in a preselected mutual relationship for automatically effecting layer patterns productive of a locked load.

It is another object of the present invention to provide a pallet loading machine of the character stated which does not require incorporation of carton or case-turning means so that the flow of cartons to the accumulation or layer-forming zone is unimpeded by the normal inherent time delay requisite for case turning and whereby through the absence of such a device the machine is amendable for continuous operation without danger of breakdown through malfunction of a delicate case-turning system.

It is another object of the present invention to provide a pallet loading machine adapted for rapid carton or case layer formation and embodying novel means for transferring a formed layer as a compact stable unit to a stripper plate for ultimate deposit upon the load being created.

It is a further object of the present invention to provide a pallet loading machine of the character stated having an empty pallet magazine with means for presenting the uppermost pallet therein directly to load-receiving disposition beneath the stripper plate thereby eliminating the heretofore accepted time consumption occasioned by the customary procedure of withdrawing the lowermost pallet from such magazine and then causing same to be elevated to initial, load position.

It is an additional object of the present invention to provide a pallet loading machine of the character stated adapted for removal of the uppermost pallet from an empty pallet magazine in a facile manner without disturbance of the underlying stack.

It is a still further object of the present invention to provide a pallet loading machine of the character stated including novel elevator means for the load being formed whereby while a fully formed load is being discharged from the machine such elevator means are being contemporaneously returned upwardly for immediately receiving an empty pallet.

It is another object of the present invention to provide a pallet loading machine of the character stated which is of general modular construction so that the components may be easily arranged for permitting carton delivery from a preselected direction.

It is a still further object of the present invention to provide a pallet loading machine which incorporates means for uniquely interrelating the operational components of the machine so as to conduce to a loading speed hitherto not considered obtainable.

It is an additional object of the present invention to provide a pallet loading machine which may be most economically manufactured; which embodies a relative simplicity of parts so as to render said machine reliable and durable in operation with marked resistance to breakdown; and which machine functions in an automatic manner so as to require a minimum of personnel supervision.

BRIEF DESCRIPTION OF THE DRAWINGS

FIG. 3 is a vertical transverse sectional view taken on the line 3—3 of FIG. 2.

FIG. 4 is a fragmentary vertical transverse sectional view taken on the line 4—4 of FIG. 1.

FIG. 5 is a fragmentary transverse sectional view taken on the line 5—5 of FIG. 4.

FIG. 6 is a fragmentary side view of a conveyor divider support.

FIG. 7 is a vertical transverse sectional view taken on the line 7—7 of FIG. 6.

FIG. 8 is a vertical transverse sectional view taken on the line 8—8 of FIG. 2.

FIG. 9 is a fragmentary top plan view taken on the line 9—9 of FIG. 8.

FIG. 10 is a side elevational view of the carriage as viewed along the line 10—10 of FIG. 2, showing the same in full lines in lowered position.

FIG. 11 is a top plan view taken on the line 11—11 of FIG. 10.

FIG. 12 is a vertical transverse sectional view taken on the line 12—12 of FIG. 11.

FIG. 13 is a vertical transverse sectional view taken on the line 13—13 of FIG. 12.

FIG. 14 is a fragmentary vertical transverse sectional view taken on the line 14—14 of FIG. 13.

FIG. 15 is a side elevational view taken substantially on the line 15—15 of FIG. 11 and illustrating the carriage in raised position.

FIG. 16 is a fragmentary side elevational view of the carriage travel means as viewed on the line 16—16 of FIG. 2.

FIG. 17 is a top plan view taken on the line 17—17 of FIG. 16.

FIG. 18 is a vertical transverse sectional view taken on the line 18—18 of FIG. 16.

FIG. 19 is an elevational view of the stripper plate operating system as viewed on the line 19—19 of FIG. 2.

FIG. 20 is a vertical transverse sectional view taken on the line 20—20 of FIG. 19.

FIG. 21 is an elevational view taken on the line 21—21 of FIG. 3.

FIG. 22 is a horizontal transverse sectional view taken on the line 22—22 of FIG. 21.

FIG. 23 is a horizontal transverse sectional view taken on the line 23—23 of FIG. 21.

FIG. 24 is a vertical transverse sectional view taken on the line 24—24 of FIG. 21.

DESCRIPTION OF THE PREFERRED EMBODIMENT

Figure 1:
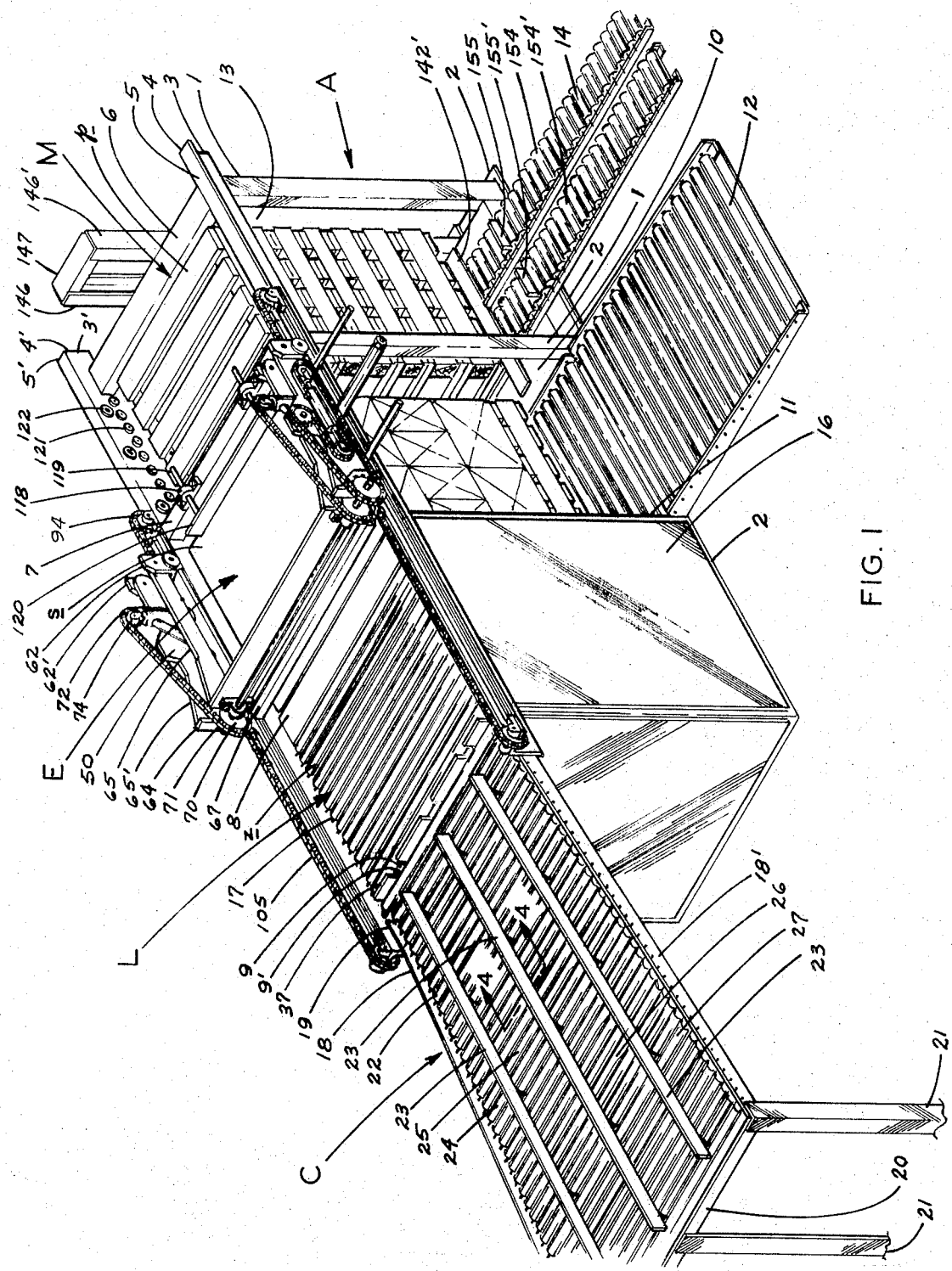
FIG. 1 is a perspective view of a pallet loading machine constructed in accordance with and embodying the present invention.

Referring now by reference characters to the drawings which illustrate the preferred embodiment of the present invention, A generally designates a pallet loading machine, more commonly referred to as a "palletizer" being adapted for disposition within an industrial establishment for receiving and stacking units upon a storage pallet and thus having a wide versatility in usage as being useful for handling such items as bottle cases, cartons, bags, etc. Machine A comprises a main frame consisting of a plurality of longitudinally and horizontally aligned uprights 1, as of channel stock, which at their lower ends may be fixed to a base plate 2 or to individual base elements. At their upper ends, the uprights along each side of machine A are fixed, as by welding, to the inner surface of the vertical flange 3 of parallel beams 4,4' which are preferably of angle stock, each having an upper horizontal flange 5, turned laterally outwardly. Said beams 4,4' extend at their ends slightly beyond the proximate uprights and rigidify the main frame. Extending between beams 4,4' spacedly throughout their extent is a plurality of cross members, as indicated at 6, 7, 8, and 9, which serve to integrate the machine frame. Through presentation of the frame components in preselected relationship, machine A is composed of three modules or sections presented in side-by-side relationship lengthwise of the said frame; the forwardmost module (with the forward end of machine A being considered at the right hand side of FIG. 2) is an empty pallet magazine indicated generally M which, if desired, may be open on its sides as through the related uprights 1 but which necessarily communicates through its rearward end with, what might be termed, a pallet loading module E comprising an elevator well 10 the upper end of which is determined by a pattern plate or "stripper plate" assembly designated generally s. Pallet loading module E is open through one side, as at 11, to provide a discharge opening for elevator well 10 for emission therethrough of unit-stacked fully loaded pallets; there being a gravity conveyor 12 provided therewith for promoting rapid discharge of a loaded pallet from machine A. Empty pallet magazine M is similarly open through one side, as at 13, which is preferably adjacent elevator well discharge opening 11 for establishing an entry for a supply of a stack of empty pallets with which there is an associated delivery conveyor 14.

The remaining module being located on the side of elevator well 10 opposite magazine M is indicated generally L and embodies an enlarged chamber 15 which on its sides and rearward end may be suitably enclosed, as by sheet stock, as at 16, and which on its forward end is open to elevator well 10 for purposes presently appearing. The upper portion of module L which is aligned with pattern plate s constitutes a unit-accumulation or layer-forming zone z which latter is comprised of a plurality of transversely extending rollers 17 suitably journaled at their ends in side flanges 3 of beams 4,4' and being adapted for power motivation by conventional means not shown; said rollers 17 being presented between cross beams 8 and 9. It will, accordingly, be observed that machine A is of fundamentally tri-partite character with each module M, E, and L being distinct yet adapted for functional integration. It is evident, therefore, that machine A is amenable, in construction, to a ready rearrangement of said modules so as to present same in opposite relationship to that illustrated in the event any particular user might wish to effect such alteration for coordinating with the particular production operations of a plant.

Provided for delivering to machine A units to be pallet-loaded is a multiple unit-feeding conveyor C which is adapted for communication with layer-forming zone z and comprising side frame elements 18,18' which at their forward ends are engaged to machine A, as direct connection to the flange 3 of the associated beams 4,4', as at 19 (FIG. 1), and which side elements 18,18' mutually diverge from their point of securement to machine A so that the same, where interconnected at their rearward ends by an end piece 20, are further apart than at their forward ends. Supporting conveyor C in appropriately elevated condition with respect to the support surface, is a plurality of uprights 21 which, at the rearward end of conveyor C, are of slightly greater height than machine A so that conveyor C, in addition to converging toward its forward end, will also be downwardly inclined toward layer-forming zone z to promote gravity feed of the units moving across rollers 22 journaled at their ends and in side frame elements 18,18'. It is to be understood that rollers 22 may also be adapted for powered operation if desired.

Conveyor C is provided with a plurality of parallel, longitudinally extending partition bars 23 which divide conveyor C into a multiplicity of discrete conveyor channels as indicated at 24, 25, 26, and 27. Each of said partition bars 23 are provided spacedly throughout their length with tabs 28 depending from their lower edge (FIGS. 4 and 5) which tabs are contoured for free extension between adjacent rollers 22 for reception within an upwardly opening, narrow recess or slot 29 provided in a support plate 30 secured, as by screws, upon the vertical leg 31 of transversely extending angle members 32 which latter are rigid at their ends with frame elements 18,18'. It is to be recognized that the number of tabs 28 together with associated support plates 30 and angle members 32 is a matter of choice being determined solely by providing adequate stability to said bars 23 throughout their length. It is to be especially noted that support plates 30, with their associated recesses 29, are so designed as to cause bars 23 to be disposed spacedly upwardly of rollers 22 so as to inhibit any undesired impediment to the operation of the latter. Also, the vertical flange 31 of members 32 is provided spacedly throughout its length with a plurality of tapped openings 33 so as to allow for preselected disposition of mounting plates 30 therealong for controlling the relative position of partition bars 23 transversely of conveyor C so that the widths of the resulting channels, as 24, 25, 26, and 27, may be altered for accomodating units of varying dimensions. It is evident that more or less than three partition bars 23 may be used as the requirements of a particular operation dictate, however, for purposes of illustration three such bars are shown for developing the four above identified channels.

With respect to FIGS. 6 and 7, an alternate form of partition bar supprt may be provided with the same being indicated generally 34 and comprising an angle member fixed at its ends to side frame elements 18,18' and having its vertical flange 35 spacedly slotted, as at 36, throughout its length. Thus, the spacing between adjacent slots 36 is fixed and will determine the increment of adjustment for partition bars 23. Members 32 and 34 constitute alternate means for adjustably supporting partition bars 23.

Presented for intermittent closure of the forward end of the channels established on conveyor C is a plurality of stop plates 37 which correspond in number to the number of channels and hence for purposes of illustration are indicated at 38, 39, 40 and 41 for respective association with conveyor channels 24, 25, 26 and 27. As may be requisite, the various stop plates 37 may be replaced in a facile manner so that the transverse extents thereof will be in correspondence to that of the associated conveyor channel. As shown herein, partition bars 23 are so mutually disposed that interior channels 25, 26 are of greater width than exterior channels 24, 27 (see FIGS. 1 and 2) and, accordingly, the corresponding interior stop plates 39, 40 are of greater length than the outer stop plates 38, 41 (FIG. 8). Said stop plates, which are referred to collectively by the numeral 37, are adapted to move reciprocally vertically through associated slot-like apertures 9' provided spacedly throughout the length of cross beam 9 and between overlying rollers 17 so that when in elevated, unit-arresting position (FIG. 1) the same will extend upwardly of beam 9 and the rollers 17 thereabove and when in lowered position the same will be withdrawn downwardly below the upper surface of beam 9. Said plates 39 may be of the type shown in the Broberg et al. U.S. Pat. No. 2,703,182; the same being operable as by means of push-type solenoids 42 having plungers which act against operating rods 43 vertically slideable within guide tubes 44 secured at their upper ends to adjusting plates 45 upon which are fixed the related stop plate 37. It is, of course, understood that said stop plates 37 may be air operated and, understandably, are adapted for selective operation in order that proper control of the pattern of the layer may be effected. In order to regidify stop plates of relatively greater length, such as, for example, stop plates 39, 40, there may be provided auxiliary guide tubes 46 with guide rods 47 slideable therein which latter are similarly engaged to the related adjusting plate 45. A support bar 48 extending between the lower ends of vertical flanges 3 of beams 4,4' is provided for mounting of the guide and operating components associated with stop plates 37; said support bar being fixed, as by welding, to angle brackets 49 which are secured to said beams 4,4'. Bar 48 may also be provided with a plurality of openings 48' for allowing of the effecting of desired changes or positioning of the stop plates 37.

As distinguished from feed conveyors heretofore utilized with pallet loading machines, conveyor C, by its multi-channel character, is adapted to permit simultaneous feedong of a plurality of units in side-by-side and end-to-end relationship. In the stacking of units upon a loading pallet, it is customary in the industry to arrange the units so as to create what is termed a "locked load" wherein the tiers or layers of the units are of alternating patterns to thereby produce an interlocking productive of load stability. The various patterns selected expectedly depend upon the dimensions and size of the units involved. Herein, for purposes of illustration, the units will be considered as non-cubic and accordingly, such units, as indicated in c, have their maximum dimension or primary axis extending lengthwise.

Figure 2:
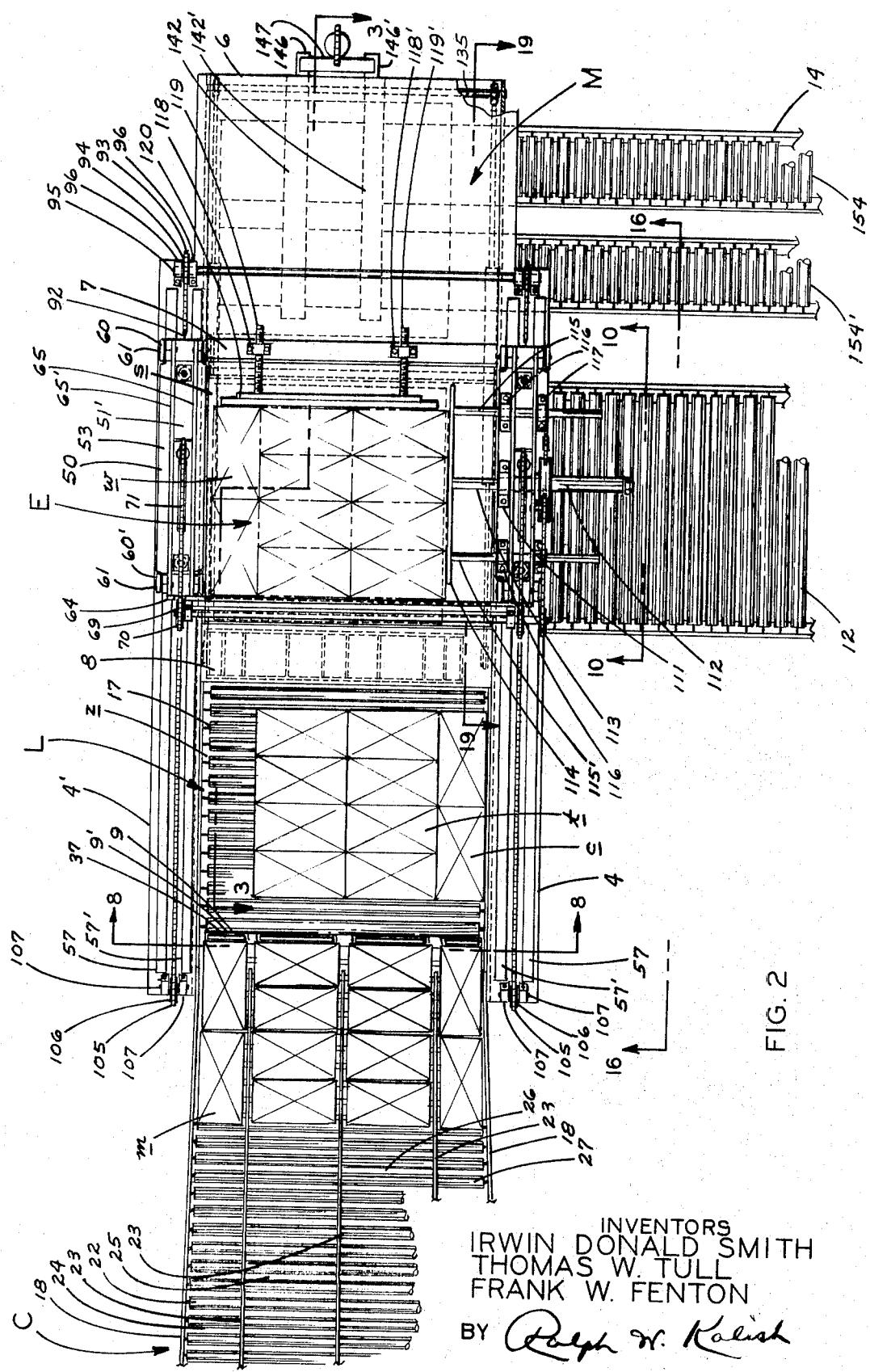
FIG. 2 is a top plan view.

Referring now to FIG. 2, it will be seen that the units c within interior channels 25, 26 are presented so that their maximum axis extends transversely of conveyor C while exterior channels 24, 27 are of such relatively reduced width as to merely accomodate units c with their major axis substantially parallel to that of machine A or normal to the units c within interior channels 25, 26. Accordingly, the produce an initial tier or layer, cartons would be fed along conveyor C within interior channels 25, 26 and exterior channel 27 so as to present a tier or layer as shown at t within the accumulator or layer-forming zone z. The next, or succeeding, tier or layer is composed of units c fed along interior channels 25, 26 and exterior channel 24 so that a reverse pattern, as indicated generally at m, is created. By means described below, stop plates 37 are controlled to cause outer stop plates 38, 41 to be alternatingly operated for unit stoppage so that the desired pattern sequence will be effected. Thus, by the arrangement shown, units c will be continuously fed along the interior channels and one and then the other of the exterior channels. The said channels of conveyor C correspond generally to the rows of units c within each layer and permit of all such rows being continuously formed so that when the requisite number of units c to constitute a tier or layer have passed over the then depressed stop plates 37, the latter will be activated by a suitable counting system, as for instance, controlled by a photoelectric unit so that said stop plates 37 will be elevated for temporarily inhibiting further unit delivery to the accumulation zone z until the layer upon the latter has been removed therefrom by means to be presently described. It should, however, be observed at this juncture that a tier or layer as at t being formed from units c progressing from channels 25, 26, 27 will be disposed within accumulation zone z so that one side is substantially contiguous with the inner face of beam 4 and with the opposite side being spaced from beam 4'. The next, succeeding layer, as indicated by the units c shown at m, will be presented within accumulation zone z so that one side will be substantially in contact with beam 4' and the opposite spaced from beam 4. This seemingly lateral offset relationship of successive tiers will be compensated by means set forth hereinbelow.

Provided for transferring a layer of units c from the accumulation or layer-forming zone z to the pattern plate assembly s is a mobile carriage designated generally 50, adapted for travel reciprocally longitudinally of machine A and which comprises a pair of side trucks 51,51' which swingably support a U-shaped frame 52. Each truck 51,51' comprises a main, flat, rectangular plate 53 presented with their longitudinal axes parallel to those of the related beam 4,4' and which are drilled in their forward and rearward portions to accomodate short vertical shafts 54,54' for carrying on their lower projecting ends, beneath plates 53, a horizontally presented roller 55,55' for rotation about the vertical axis of the related shaft and which rollers are received within a channel 56 developed on the upper surface of beams 4,4' by a pair of transversely spaced bars 57,57' fixed upon the upper surfaces of the horizontal flanges of said beams 4,4'. Thus, rollers 55,55' prevent accidental lateral displacement of the related truck 51,51' during traverse of the latter along said bars 57, 57'. Said bars 57,57' on their outer edges, are spaced from the adjacent edge of the related horizontal flange of beams 4, 4' to create a track 58,58'. At the forward and rearward side extremities of main plate 53 there are provided recesses, as at 59, for accomodating forward and rearward sets of wheel 60, 60', respectively, mounted for rotation about horizontally extending axes 61 suitably journaled within vertically extending, short forward and rearward thrust bars 62,62', respectively, fixed at their lower ends upon main plate 53. With reference to FIGS. 11 and 12, it will be seen that wheels or rollers 60 are received upon tracks 58,58' and thus render carriage 50 mobile.

U-shaped frame 52 constitutes a pair of side elements 63,63' and a cross plate 64 fixed to said side elements 63,63' at their rearward ends for normally disposing said cross plate 64 at the rearward end of carriage 50. Each side element 63,63' consists of a pair of parallel transversely spaced apart narrow plates 65,65' which at their forward ends are swingably secured, as by a pin 66,66', to the related forward thrust bar 62 62'; said plates 65,65' extending at their rearward ends slightly beyond main plates 53 and being welded or otherwise fixed to the forward face of cross plate 64. Secured upon the lower portion of the rearwardly directed face, of cross plate 64, below its point of engagement with side elements of said frame 52, is a channel, or so-called hat-shaped, member 67 which serves to reinforce said plate 64; said member 67 having an extent greater than the distance between beams 4,4' so as to provide requisite support to said cross plate 64 as the same engages confronting units c within zone z during forward transmission of the formed layer upon travel of carriage 50. Also carried upon the rearward face of cross plate 64 upwardly of member 67 and in overlying relationship to beams 4,4' are pillow blocks 68,68', respectively, for journaling of a transversely extending shaft 69. Keyed upon said shaft 69 proximate each pillow block 68,68' is a sprocket wheel 70 to which is fixed the rearward end of a chain 71 which progresses forwardly for engagement about an idler sprocket 72 mounted upon a pin 73 carried by a clevis 74 supported at the upper end of a post 75 presented substantially centrally of main plate 53 and being of such height as to normally extend above the adjacent frame elements 65,65'. From idler sprocket 72, chain 71 continues downwardly for anchoring of its forward end upon a rod 76 fixed at its ends in frame elements 65,65' and extending therebetween. Post 75 is braced by a strut 77. With reference to FIG. 12, it will be seen that cross plate 64 is recessed or notched, as at 78, so as to allow chain 71 to unobstructedly pass therethrough.

Also keyed or otherwise provided upon shaft 69 at its end slightly beyond beam 4 is a drive sprocket 79 about which is engaged a drive chain 80 the upper course of which extends forwardly for disposition about an idler sprocket 81 carried on a stub shaft 82 suitably journaled in a boss 83 extending upwardly from frame element 65 of truck 51 (FIGS. 10 and 11). Said chain 80 is directed rearwardly from said idler sprocket 81 for engaging a sprocket wheel 84 carried, as by a pin and clevis arrangement indicated 85, on the rearward end of a piston 86 of a double-acting fluid cylinder 84 suitably supported on the outer face of said frame element 65 of truck 51 by a mounting bracket 88. From sprocket wheel 84 the said upper course of chain 80 continues forwardly for anchoring of its end proximate the rearward end of cylinder 87, as at 88'. The lower course of chain 80 progresses forwardly beneath fluid cylinder 87 for direction upwardly and engagedly about a sprocket wheel 89 mounted, as by a pin and clevis arrangement 90, upon forward end of said piston 86. The end extremity of said lower course of chain 80 is fixed upon the upper surface of fluid cylinder 87 immediately proximate its forward end, as at 91. The various fluid supply and exhaust lines for cylinder 87 are not illustrated as the said cylinder does not form a part of the present invention; it being understood that the same is integrated as a part of a conventional fluid system incorporating the requisite source of fluid, pump, and the like.

It will therefore be seen that when fluid is directed to cylinder 87 so as to cause piston 86 to move rearwardly, said chain 80 will cause shaft 69, through operation of drive sprocket 79, to rotate in a clockwise direction as indicated by an arrow in FIG. 10. Sprocket wheel 70 will similarly move in a clockwise direction to thus cause the U-shaped frame 52 to be in lowered condition as shown in full lines in FIG. 10. Correspondingly, with fluid being directed to cylinder 87 so as to cause piston 86 to move forwardly, said shaft 69 will be rotated in a counter-clockwise direction and with such direction of rotation of sprocket wheel 70 causing a pulling, as it were, upon chain 71 so as to effect an upward swinging of U-shaped frame 52 about the pivot axis established by axially aligned pins 66 into raised condition as indicated in phantom lines in FIG. 10 and in full lines in FIG. 15. The arc of swing of U-shaped frame 52 is such that when the same is in such elevated condition, cross plate 64 will clear units $c$ disposed within accumulation zone $z$ so as to prevent any untoward contact during movement of carriage 50 with frame 52 in such attitude for purposes to be described below.

Secured to the forward end of the base plate 53 of each truck 51,51', as by an eyelet 92, is a chain 93 which progresses forwardly above the horizontal flange of the respective beam 4,4' for engagement about an idler sprocket 94,94', respectively, carried upon the opposite ends of a shaft 95 journaled in bearings 96,96' mounted on the flange 5 of the related beam 4,4', respectively, spacedly forwardly of pattern plate $s$ (see FIGS. 1 and 16); each of said related beam flanges 5 is apertured, as at 97, for extension therethrough of the associated sprocket wheel 94, 94', as well as to permit the related chain 93 to continue downwardly beneath said flange and thence rearwardly for disposition about a sprocket wheel 98 mounted, as by a pin and clevis arrangement 99, on the forward end of a piston 100 of a fluid cylinder 101 which latter is supported upon the outer surface of the vertical flange of the associated beam 4,4' as by brackets 102 (FIGS. 16 and 18). From its engagement with sprocket wheel 98, chain 93 returns forwardly for anchoring, as at 103, upon the vertical flange of the associated beam 4,4', as the case may be, with such point of securement being substantially directly below idler sprocket 94. At its rearwad end, the base plate 53 of each truck 51,51' is engaged, as by an eyelet 104, to a chain 105 which extends rearwardly above the proximate beam 4,4' for disposition about an idler sprocket 106 suitably mounted for rotation, as by blocks 107, located at substantially the rearward end extremity of the related beam 4,4'; the horizontal flange of the latter being suitably cut away to permit rotation of said idler sprocket 106. Each chain 105 continues forwardly from idler sprocket 106, beneath the adjacent horizontal flange of beams 4,4' for engagement about a sprocket wheel 108 rotatably mounted by a pin and clevis arrangement 109 fixed on the rearward end of piston 100; said fluid motor being thus of double-acting type. Chain 105 is thence returned rearwardly, for anchoring at its rearward end extremity, as at 110, upon the outer face of the vertical flange of the associated beam 4,4' immediately adjacent the rearward end edge thereof. Fluid cylinder 101 thus constitutes a component of the fluid system of machine A which is of conventional nature, as above indicated, so that the fluid supply and exhaust lines are not shown. However, it is quite apparent that by operation of said cylinder 101, carriage 50 may be caused to traverse forwardly and rearwardly the portion of said beams 4,4' between the terminal idler sprockets 94,106.

In view of the foregoing it will thus be seen that carriage 50 is adapted to travel forwardly of machine A from an initial position wherein cross plate 64 is located rearwardly of the units $c$ received within the accumulation zone $z$ as indicated at $t$ in FIG. 2, to a forwardmost position wherein cross plate 64 is substantially vertically aligned with the rearward edge of pattern plate $s$ (see FIGS. 1 and 2). Such forward travel of carriage 50 may be considered its operative movement in that cross plate 64 will serve as a pusher so as to cause the layer-forming units $c$, at $t$, to be moved from zone $z$ for reception upon pattern plate $s$. Rollers 17 may be of the powered type so as to promote the facile travel of units $c$ thereacross under the impulsion of cross plate 64. The reciprocal, or return travel of carriage 50 causes same to be restored to initial position for effecting transfer of the subsequent layer $t$ to pattern plate $s$. Upon such return movement of carriage 50, the U-shaped frame 52 is caused, by operation of fluid cylinder 87, to be upwardly swung so that interfering contact with units $c$ being simultaneously received in accumulation zone $z$ will be obviated. The downward swinging of U-shaped frame 52 is accomplished immediately after arrival of carriage 50 at the starting point for its operative travel.

Mounted on base plate 53 of truck 51, centrally thereof, is a pair of transversely arranged mounting brackets 111 for a fluid cylinder 112 disposed in axially normal relationship to the adjacent main plate 53 and extending laterally beyond the proximate beam 4. The inner end of cylinder 112 terminates adjacent the inner edge of the associated main plate 53 and slideably carries a piston 113 for movement in a direction toward and away from opposed beam 4' thus, with its stroke being along a path perpendicular to the longitudinal axis of machine A. At its inner end, piston 113 is secured centrally to a ram or pusher bar 114 which is stabilized by guide rods 115, 115' secured at their inner ends to the said pusher bar 114 and being slideably received within guide bearings 116, 117 mounted upon main plate 53; said guide rods 115,115' being axially parallel to piston 113 and being presented on opposite sides thereof. Fluid cylinder 112 also forms a part of the fluid system of machine A; it being recognized that the supply and exhaust lines therefor are not shown.

Pusher bar 114 is presented for engaging the end surfaces of units $c$ of layer $t$ confronting a portion of the vertical flange of beam 4 within accumulation zone $z$. As carriage 50 commences its forward layer-transmitting movement from its starting position, fluid cylinder 112 is actuated so that pusher bar 114 is caused to travel inwardly of machine A toward the opposite beam 4'. If layer *t* has been formed from units *c* which have moved through conveyor channels 25,26, and 27, as shown in FIG. 2, said pusher bar 114 will thus cause a transverse component of translation to be accorded said layer *t* as the same is being impelled forwardly of machine A for ultimate disposition into the position indicated at *w* in FIG. 2, the stroke of piston 113 being so controlled that the inner limit of disposition of pusher bar 114 will be such as to compactly present said tier between same and the opposed beam 4' with cross plate 64 coacting therewith against the end face of the particular layer *t*. However, if the particular tier *t* in zone *z* shall have been constituted of units *c* from conveyor channels 24, 25, and 26, such layer will, understandably, not be accorded a transverse component of travel, as the same is driven by cross plate 64 onto pattern plate *s* as in such event pusher bar 114 will merely serve as a lateral stabilizer for such tier as the same follows a linear path forwadly of machine A.

Mounted upon the upper surface of cross member 7 of the main frame of machine A, which cross member thus presents a line of demarcation between magazine M and pallet loading module E, is a pair of spaced apart tapped brackets 118,118' for threadedly receiving screws 119,119', respectively, which at their rearward ends are engaged to a transversely extending bumper plate or detent 120, presented in opposed relationship to cross plate 64 when the latter is in lowered position. Bumper plate 120 thus serves as an abutment for engaging the forward surface of the layer *w* received upon the pattern plate *s* which layer *w* is thus snugly held between bumper plate 120, pusher bar 114, cross plate 64 and the intervening portion of the vertical flange of beam 4'. It will thus be seen that pusher plate 120 is adequately spaced from its end adjacent beam 4 so as to allow unobstructed inward travel of pusher bar 114.

Pattern plate *s*, as may best be seen in FIGS. 1 and 3, is of unitary rectangular character with its lateral edges being supported upon a plurality of stub rollers 121 mounted upon the inward face of the vertical flanges of beams 4,4'; said stub rollers 121 being in series throughout the longitudinal extent of pallet loading module E and magazine M (FIGS. 1 and 3) so that, under impetus to be described, pattern plate *s* is movable longitudinally of machine A from covering disposition over elevator well 10, (FIG. 1) wherein it is presented for receiving a layer of units *c* from accumulation zone *z* as above described, and withdrawn position wherein the same is disposed above the upper end of magazine M (FIG. 3). As shown in FIG. 3, a plurality of guide rollers 122 are mounted upon the vertical flanges of beams 4,4' within magazine M and spacedly upwardly of rollers 121 for engaging the upper lateral surface of pattern plate *s* so as to retain same against undesired vertical shifting between said rollers 121 and 122.

Referring now to FIG. 19, it will be seen that pattern plate *s* in each of its lateral rearward portions and on its undersurface is fixed, as at 123, to one end of a chain 124 extending rearwardly for engagement about an idler sprocket 125 rotatably mounted upon a shaft 126 carried on the vertical flange of the proximate beam 4,4'; said chain 124 extending thence forwardly from idler sprocket 125 downwardly of pattern plate *s* for disposition about a sprocket wheel 127 mounted, as by a pin and clevis assembly 128, carried on the rearward end of a piston 129 of a double-acting fluid cylinder 130 presented lengthwise of machine A and supported by brackets 131 spacedly secured upon a mounting plate 132 fixed to the inner face of the vertical flange of the related beam 4,4'. Chain 124 continues rearwardly from sprocket wheel 127 for attachment to a turn buckle *a* which latter is secured to a lub *b* depending from the adjacent beam 4,4'. Secured to the undersurface of pattern plate *s* in each of its forward lateral portions are chains 133 progressing forwardly for engagement about idler sprockets 134 rotatably mounted upon the opposite ends of a transversely extending shaft 135, fixed at its ends on beams 4,4' immediately adjacent their forward extremities, slightly beyond magazine M; said chains 133 being then directed rearwardly from the related idler sprocket 134 for disposition about sprocket wheels 136 mounted, as by pins and clevis assemblies 137, on the forward end of pistons 129. From sprocket wheels 136, chains 133 extend forwardly for securement to turn buckles 138, which latter are suitably secured to lugs 139 depending from beams 4,4' (FIG. 19). As indicated above with respect to other constituents of the incorporated fluid system, fluid cylinders 129 are connected by fluid exhaust and fluid supply lines to a conveniently located fluid reservoir operatively connected to a customary pump and having the conventional solenoid-operated valves. Thus, it will be seen that by actuation of cylinders 130, pistons 129 will be caused to extend rearwardly or forwardly thereof, as required, for translating pattern plate *s* between its two above described positions.

Extending transversely across the underface of pattern plate *s* is an actuator bar 140 fixed, as by welding, to said plate *s* by a horizontal flange 141. With pattern plate *s* in fully withdrawn position, that is, disposed across the normally upper end of magazine M, said actuator bar 140 is presented for engaging the confronting side portion of the uppermost storage pallet *p* of a stack of such pallets supported upon a pair of transversely spaced apart arms 142, 142' disposed in parallel relation and extending lengthwise of machine A (FIGS. 2 and 3); said arms being integral at their forward ends with a support plate 143, as of channel form, which latter is reduced in its forward portion, as at 143', to constitute the lower end of an arm guide unit, indicated generally *g*, said unit *g* includes lateral, vertical components 144 which are interconnected at their upper ends by a transverse component 145; said components 144 and 145 being preferably of box cross section to present a rigid structure. By reason of its construction, guide unit *g* is adapted to move vertically within spaced apart guide channels 146, 146' secured at their ends upon the base plate 2 and projecting upwardly beyond magazine M and being interconnected by a top cross member 147. Thus, channels 146, 146' constrain arm guide *g* against untoward tilting action so that said arms 142 are maintained in level, horizontal disposition during movement upwardly and downwardly within magazine M.

Fixed to the upper surface of support plate 143, in its central forward position, is one end of an elevating chain 148 which extends upwardly for disposition about a sprocket wheel 149 mounted, as by a pin and clevis assembly 150, upon the upper end of a piston 151 of a fluid cylinder 152 supported at its lower end upon base plate 2 and extending upwardly slightly forwardly, and centrally, of channels 146, 146'. The opposite end of chain 148 is anchored to a bracket 153 affixed to the upper end portion of cylinder 152. As with the other fluid cylinders of machine A, cylinder 152 is properly connected, by exhaust and supply lines, to a reservoir (not shown) and being in communication with a pump (not shown). Thus, by operation of fluid cylinder 152, piston 151 may be appropriately lowered for presenting arms 142 to support a full stack of empty pallets and to be appropriately actuated for incremental upward extension for elevating the reduced stack as the uppermost one is removed by actuator bar 140 as pattern plate s is returned to pallet loading module E, as will be more fully described hereinbelow.

As suggested above, conveyor 14, which may, as shown, consist of a pair of relatively narrow conveyors, as at 154, 154', effects communication of magazine M with a remote pallet storage area so that a stack of empty pallets may be transmitted from the latter for reception within magazine M for recharging of said magazine. Each of said conveyor members 154, 154' is provided with a solenoid actuated stops 155, 155', respectively, which by means to be indicated hereinbelow, are adapted for movement into upward, operative position intermediate a pair of rollers of the respective conveyors for inhibiting further travel of any empty pallets toward magazine M so as to assure delivery will not be made until the latter is in condition to receive a further supply. Stops 155, 155' are thus mounted for reciprocal, vertical movement between stack-arresting position and lowered, or inoperative position.

Presented for supporting a pallet p beneath pattern plate s and within pallet loading module E for loading of the same, is an elevator, or so-called "lowerator," assembly, indicated generally 156 (FIG. 3), and which comprises a plurality of horizontally aligned guide posts 157, 158, 159, and 160 which latter are presented at the forward end of module L so that the forwardly presented surfaces of said guide posts, in effect, constitute the rearward limit of elevator well 10. Said outer guide posts, 157, 160 are constituted of a pair of channel shaped members 161, 162, 161' and 162', respectively, which are spaced apart and open away from each other so that guideways 163, 163' are developed between the confronting web portions of said channel members. Guide posts 158, 159 are of tubular construction, preferably being box-shaped in cross section; all of said posts 157, 158, 159 and 160 being rigid at their lower ends on base plate 2 and connected at their upper ends to transverse or cross member 8, the forward edge of which will be in immediate adjacency to the rearward edge of pattern plate s when the same is in overlying relationship to elevator well 10. Said posts 158, 159 are spaced apart to form therebetween a central guideway 165. As may best be seen in FIGS. 22 and 23, the forwardly directed faces of posts 158, 159 and the forward flanges of the channels comprising posts 157, 160 are planarwise aligned as are the respective rearward surfaces and rearward flanges so as to constitute slide surfaces for a sleeve-like carriage 166 which embodies forward and rearward parallel plates 167, 168, respectively, for slideable relationship with respect to said forward and rearward slide surfaces and with said plates 167 and 168 being interconnected by end plates 169, 170 which latter are in sliding contact with the edges of the flanges of channel members 161, 162' of posts 157, 160, respectively. In its lower end portion, forward plate 167 of carriage 166 is provided with a series of transversely extending recesses aligned with, but of greater transverse extent than, guideways 163, 165, and 163' for extension therethrough of the rearward surfaces of stabilizing rollers 171, 172, 173 which are each mounted upon a shaft 174 suitably journaled in bearings 175 carried upon said plate 167. End plates 169, 170, as shown in FIG. 23, may extend forwardly of plate 167 so as to embody a bearing, as at 176, 177, respectively, for the end of the proximate shaft. Secured, as by screws, upon rearward plate 168 of carriage 166 are mounting plates 178, 179, 180 (see FIG. 21) each of which, in its upper ends, immediately above the top edge of plate 168, embody spaced apart ears, such as at 181, which are apertured to provide bearings for a shaft 182 extending therebetween to mount stabilizing rollers 183, 184, 185, respectively. Said plates 178, 179, and 180 are of such construction and so mounted upon rearward plate 168 as to present the related rollers 183, 184, 185, respectively, for disposition across the rearward opening of guideways 163, 165, and 163' respectively, whereby the end portions of said rollers will suitably abut the adjacent portions of the rearward slide surface developed by said guide posts. It will be observed that forward rollers 171, 172, and 173 are longitudinally respectively aligned with rollers 183, 184, and 185, which are located in the lower forward portion of carriage 166, while said latter rollers are located in the upper rearward portion of said carriage. Thus, the various rollers coact to assure smooth travel of carriage 166 vertically, reciprocally of posts 157, 158, 159 and 160 while simultaneously stabilizing same against accidental or untoward friction-producing tilting or like binding movement.

Provided on the inside faces of the opposed lateral walls of each guide post 158, 159, at their upper ends immediately beneath top plate 164, are mounting blocks, indicated at 186, 186' being alignedly drilled for accepting the ends of forward and rearward transverse shafts 187, 187' upon which are mounted for rotation forward and rearward sprocket wheels 188, 188' which, within each guide post 158, 159, are longitudinally aligned for engaging a chain 189; the forward and rearward walls of each post 158, 159 being suitably recessed, as indicated at 190, for extension therethrough of portions of the proximate sprocket wheels 188, 188'. Each chain 189 extends downwardly from its forward sprocket 188 for fixing at its lower end on the lower portion of forward plate 167 of carriage 166. From rearward sprockets 188', each chain 189 progresses downwardly toward base plate 2 for disposition about idler sprockets 191 carried upon a common, horizontally disposed shaft 192 journaled in bearings 193 upstanding from mountings 194 bolted at base plate 2. From their respective idler sprockets 191, chains 189 are directed returningly upwardly for engagement upon sprockets 195 rotatably upon the upper end of a vertically presented piston 196 by means of a pin and clevis assembly 197; each piston 196 being slideably received within a fluid cylinder 198 supported at their lower ends upon base plate 2. The rearward end extremity of chain 189 is anchored to the upper rearward side portion of cylinder 198 at 199. It will be apparent that carriage 166 will be caused to travel vertically along guide posts 157, 158, 159 and 160 through appropriate operation of fluid cylinder 198 so as to cause piston 196 to be forced upwardly, effecting upward travel of carriage 166, or downwardly to cause corresponding travel of said carriage. As with the components of the fluid system of machine A, cylinders 198 are requisitely equipped with exhaust and supply lines for communication with the fluid reservoir (not shown).

Fixed to the rearward face of plate 168 of carriage 166, as by welding, for extention rearwardly thereof, are three transversely spaced apart, planar parallel metal plates 200, 201, 202 which are aligned with guideways 163, 165, 163' respectively, and each incorporates a horizontal flange 203 at its upper edge. Mounted on each of said flanges 203, as by longitudinally spaced apart brackets 204, are longitudinally extending fluid cylinders 205, 206, 207 which in their forward portions project into the related guideways 163, 165, 163' through openings provided in the adjacent mounting plates 178, 179, 180. Each of said cylinders slideably mounts a piston 208, 209, 210 respectively, which is extensible from the forward end of its related cylinder into elevator well 10 (see FIGS. 3 and 23). Suitably carried upon each piston in overlying axial parallel relationship thereto is an arm 211, 212, 213, respectively, which have a length greater than the length of the related piston when the latter is fully extended (FIG. 3) so that the rearward portion of each arm 211, 212, 213 will normally, when extended, overlie the associated cylinder (FIG. 3) as said arms 211, 212, 213 are movable through guideways 163, 165, 163' respectively; projecting through apertures 214, 215, and 216 formed in mounting plates 178, 179, 180 respectively. Said latter apertures serve as a control for the related arms so as to assure horizontal disposition of the same.

With reference now being made to FIG. 3, it will be observed that arms 211, 212 and 213 are movable through operation of the related fluid cylinders between operative, extended position, within elevator well 10 to support a pallet p during loading thereof by stacked units c, and retracted or inoperative position wherein the same are rearwardly withdrawn into chamber 15 being thus totally removed from elevator well 10.

ELECTRICAL SYSTEM

Figure 25:
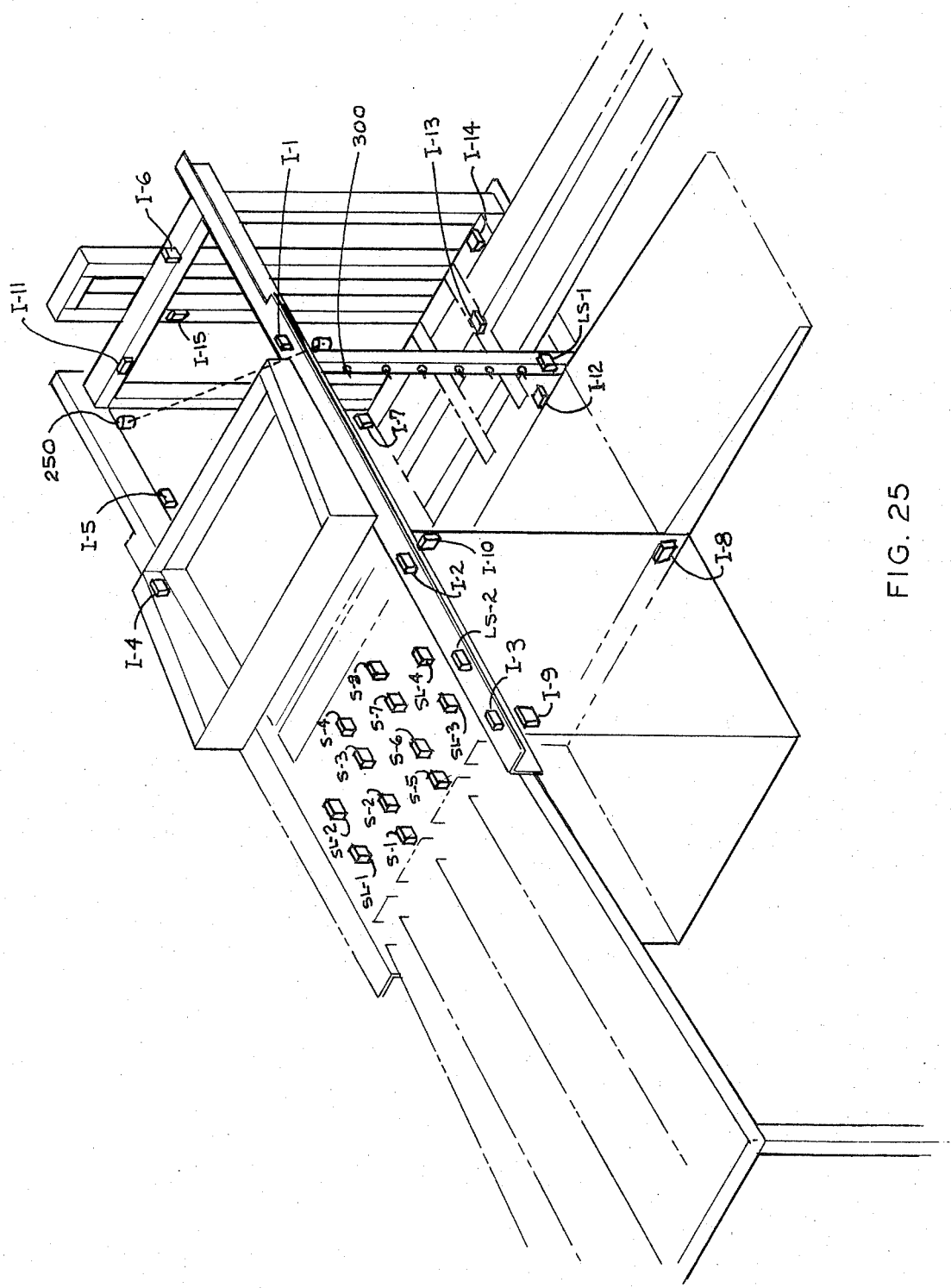
FIG. 25 is a phantom drawing of the machine showing the location of the switches thereon.
Figure 26:
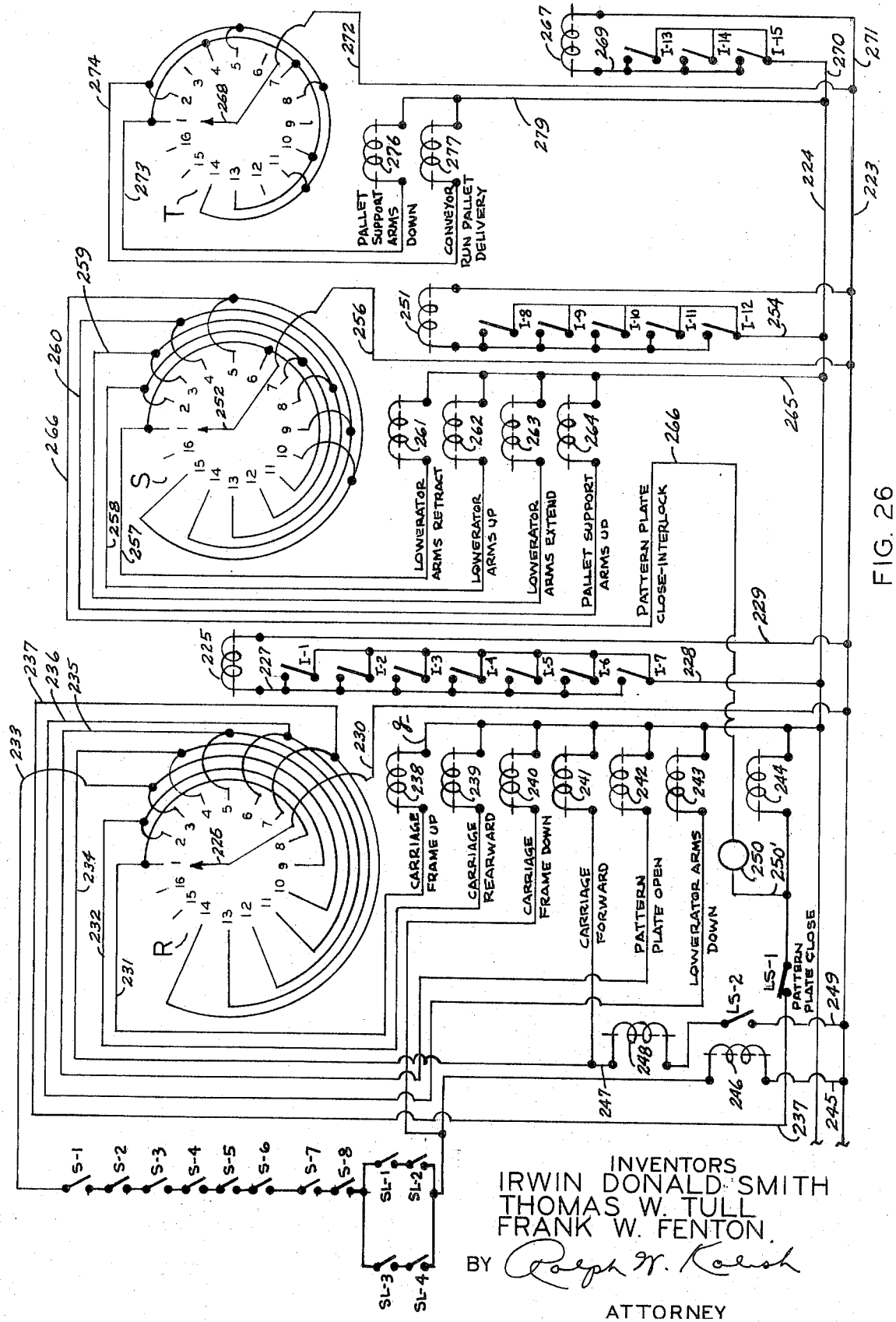
FIG. 26 is a wiring diagram.

With reference now being made to FIG. 25 and, particularly to the wiring diagram shown in FIG. 26, R, S, and T designate stepping switches which, by circuitry to be described, are connected in parallel across the ground wire and common wire 223, 224, respectively, which constitute the main leads to a conveniently located 110-volt A.C. source. Each of said stepping switches R, S, and T are of like construction incorporating a plurality of stationary terminals or contacts, arranged in a circular pattern, which are sequentially numbered in the digram and which will be referred to by designation comprising the reference letter of the switch and the particular terminal, such as, for example, terminals on stepping switch R will be referred to as R-1, R-2, etc.; those on stepping switch S as S-1, S-2, etc.

Stepping switch R embodies a solenoid 225, the armature of which is operatively connected by the customary pawl and ratchet wheel (not shown) with a switch wiper arm 226 for serially engaging the terminals of said switch. Solenoid 225 is in circuit by means of a conductor 227 with impulse switches I-1, I-2, I-3, I-4, I-5, I-6, and I-7 which are in parallel and the opposite sides of which are connected by a lead 228 to common wire 224. The other side of solenoid 225 is connected to ground wire 223 through a conductor 229.

Wiper arm 226 of setpping switch R is in circuit with ground wire 223 by a lead 230. Switch terminals R-1, R-2, R-3, R-4, R-5, R-6, and R-7 are connected by leads 231, 232, 233, 234, 235, 236, and 237, respectively, to solenoid coils 238, 239, 240, 241, 242, 243, and 244, respectively, which latter are in circuit by a common lead c to main conductor 224.

For operating purposes, stepping switch R may have but the aforesaid seven terminals. However, as shown in the drawings, said switch R may have more than seven terminals so that, for instance, R-8, R-9, R-10, R-11, R-12, R-13, and R-14 may constitute a second cycle of operation as the said contacts have common connectors with the respective terminals R-1 through R-7. Since there are no leads for terminals R-15 and R-16, the same being dead points, wiper arm 226 will thus, in moving from R-14, "home" by returning to R-1 in accordance with well known practice.

Solenoid coils 238 and 240 are adapted for operating the valves (not shown) of fluid cylinder 87, while solenoid coils 239 and 241 are, respectively, engaged to the valves (not shown) for effecting operation of fluid cylinder 101. Solenoid coils 242 and 244, upon energization, effects operation of the opposed valve of fluid cylinder 130, while solenoid coil 243 causes operation of cylinder 198 to being about descent of the elevator or lowerator in assembly 156.

Provided within lead 233 for interposition between stepping switch R and solenoid coil 241 is a plurality of normally open safety switches, indicated $s-1$, $s-2$, $s-3$, $s-4$, $s-5$, $s-6$, $s-7$, and $s-8$ which are in series, and switches $s1-1$ and $s1-2$, and $s1-3$ and $s1-4$ which, being in pairs, are in parallel but are in alternative serial construction with the aforesaid safety switches so as to provide alternate paths for circuit closure for purposes presently appearing. Said safety switches are disposed within zone z appropriately located between the rollers thereof, for projection slightly thereabove when open, for closure by the units c received thereon. Thus, with reference now being made to FIG. 26 it will be seen that series switches $s-1$ through $s-8$ correspond to the eight such units c which are presented in the pattern with their major axes perpendicular to the direction of travel. Safety switches $s1-1$ and $s1-2$ are disposed at one side for closure by means of the two units c, illustrated in FIG. 2, within the zone z with their major axes parallel to the direction of travel. Safety switches $s1-3$ and $s1-4$ are located on the opposite side of zone z for closure by means of unit c received thereover, with their major axes parallel to the direction of travel. It will thus be seen that by the parallel arrangement of the lateral switches the circuit will be closed through lead 233 when each of said safety switches $s-1$ through $s-8$ are closed and either $s1-1$ and $s1-2$ or $s1-3$ and $s1-4$ are closed. Sais safety switches are also connected to ground wire 233 by a branch lead 245 within which there is disposed a solenoid 246 for causing operation of case stops 37. If desired, solenoid 246 may be adapted for effecting joint operation of each of said case stops 38, 39, 40, 41 or may be replaced by a plurality of solenoids for operating each of said case stops concurrently.

Lead 234 is connected by a conductor 247 to the solenoid coil 248 for operating the valves of cylinder 112 of pusher bar 114; said solenoid coil 248 being connected at its other side to ground wire 223 by a lead 249 within which is disposed a normally open limit switch LS–2.

Presented within lead 237 between solenoid 244 and switch S is a normally closed limit switch LS–1.

Stepping switch S incorporates a solenoid 251, the armature of which is operatively connected to the wiper arm 252 of said switch S for sequentially engaging the terminals thereof. Solenoid 251 is in circuit by means of a lead 253 with impulse switches I–8, I–9, I–10, I–11, and I–12 which are in parallel and the opposite sides of which are connected by lead 254 to common wire 224. The other side of solenoid 251 is connected to ground wire 223 by a conductor 255.

Wiper arm 252 of stepping switch S is also connected to ground wire 223 as by lead 256. Switch terminals S–1, S–2, S–3, and S–4 are connected by conductors 257, 258, 259 and 260, respectively, to solenoid coils 261, 262, 263 and 264, respectively, which latter are in circuit through a lead 265 with common conductor 224. Terminal S–5 of switch S is connected by a conductor 266 to one side of a light sensing element, or photoelectric cell 250, the opposite side of which is connected by a conductor 250' to a lead 237 between limit switch LS–1 and solenoid 244 whereby, for purposes presently appearing, an interlock is effected between stepping switches R and S. For operating purposes, stepping switch S may have but the aforesaid five terminals. However, as shown in the drawings, stepping switch S may have more than five terminals so that the series S–6 through S–10, and the series S–11 through S–15 may constitute second and third cycles as the terminals thereof have common connectors with the related or corresponding terminals in the series of S–1 through S–5. As terminal S–16 is without a lead, wiper arm 252 is adapted to move from S–15 to S–1, thus "homing" in accordance with well known practice.

Solenoid coil 261 operates the valves (not shown) for effecting retracting action of cylinders 205, 206 and 207 to withdraw elevator or lowerator arms 211, 212, and 213 from elevator wall 10 within module L. Solenoid coil 262 is operatively connected to the valves for actuating cylinders 198 to effect upward movement of the associated pistons for raising the said arms of lowerator assembly 156 within said module L while retracted. Solenoid coil 263 is adapted for causing requisite operation of the valves (not shown) associated with cylinders 205, 206, and 207 for extending the related arms 211, 212 and 213 into elevator well 10 for pallet and load support. Solenoid coil 264 operates the valves (not shown) of cylinder 152 for elevating empty pallet support arms 142, 142' within pallet magazine M.

Stepping switch T contains a solenoid 267; there being the customary pawl and ratchet wheel (not shown) for operatively connecting the armature of said solenoid 267 with a switch wiper arm 268 for sequentially engaging the terminals of said switch T. Solenoid 267 is in circuit by a conductor 269 with impulse switches I–13, I–14, and I–15 which are in parallel and the opposite sides of which are in circuit by a lead 270 to common wire 224. The other side of solenoid 267 is connected to ground wire 223 by conductor 271.

Wiper arm 268 of stepping switch T is also connected to ground wire 223 by a lead 272. Switch terminals T–1 and T–2 are connected by leads 273 and 274, respectively, to solenoid coils 276 and 277, respectively, which latter are in circuit by a common lead 279 to main conductor 224. For operating purposes, stepping switch T has but the aforesaid two active terminals and one dead terminal, the latter being T–3. However, as shown in the drawings, stepping switch T may have more than one such series so that each successive series of three such terminals, namely, T–4 through T–6; T–7 through T–9; T–10 through T–12; and T–13 through T–15 may constitute second, third, fourth and fifth cycles of operation as the first two contacts of each series have common connectors with the respective terminals T–1 and T–2. Since no lead is indicated for terminal T–16, wiper arm 268 thus in moving from T–15 "homes" by returning to T–1 in accordance with conventional operation.

Solenoid coil 276 operates the valves (not shown) of cylinder 152 for effecting descent or lowering of empty pallet support arms 142, 142' in pallet magazine M. Solenoid coil 277 is operatively connected to the valve (not shown) of a hydraulic motor (not shown) for driving delivery conveyor 14.

OPERATION

The operation of machine A may be described in using as a starting point, that juncture in the operation when pattern plate $s$ is returned to closed condition with a pallet $p$ presented upon arms 211, 212, and 213 in upper position within well 10, poised for reception of the first layer of units $c$. By such closing movement pattern plate $s$ will engage impulse switch I–7 which will cause wiper arm 226 of stepping switch R to be moved, or restored, to engagement with terminal R–1. By closing the circuit through said terminal, cylinder 87 will be appropriately operated to cause carriage frame 52 to be swung upwardly (see FIG. 10), which upward swinging will trigger inpulse switch I–1 effecting movement of wiper arm 226 into circuit closure with terminal R–2 and thereby initiating rearward travel of carriage 50 by appropriate operation of cylinder 101. Such rearward travel will terminate upon triggering of impulse switch I–2, which will cause wiper arm 226 to be stepped to terminal R–3. With reference to the wiring diagram, it will be seen that the circuit to solenoid coil 240 will not be closed unless safety switches $s$–1 through $s$–8 are closed, as well as either $s1$–1 and $s1$–2 or $s1$–3 and $s1$–4, which closure is established by the units c forming the layer to be transferred. Additionally, it will be observed that upon such closure solenoid 246 will be energized for causing upward movement of case stops 37 to assure against any interferring movement of units $c$ from conveyor C into the accumulation zone z at this point. Thereupon, cylinder 87 will be operated to cause carriage frame 52 to swing downwardly into position for layer-transfer, with such downward movement triggering impulse switch I–3 to cause wiper arm 226 to be stepped into contact with terminal R–4 whereby solenoid coil 241 is energized to operate cylinder 102 for bringing about forward travel to carriage 50 for moving the frame-contained units $c$ toward pattern plate $s$. During its forward travel, carriage frame 52 will close limit switch LS–2 for energizing solenoid coil 248 to operate cylinder 112 to cause pusher bar 114 to engage the layer in question to assure proper location of same upon pattern plate $s$ for the consequent stripping action. The forward travel of carriage frame 52 is terminated by actuation of impulse switch I-4 causing wiper arm 226 to be stepped into engagement with terminal R-5 which latter, in turn, brings about appropriate actuation of cylinder 130 and opening movement of pattern plate *s* whereby the layer is deposited upon the underlying pallet *p*. At the limit of its forward travel, pattern plate *s* will actuate impulse switch I-5 thereby advancing wiper arm 226 to erminal R-6 resulting in operation of cylinder 198 for effecting descent of the lowerator or elevator arms 211, 212 and 213 within elevator well 10, which downward movement is terminated by triggering of impulse witch I-6 which is carried upon one of said lowerator arms, and is appropriately actuated by switch actuators, indicated at 300 in FIG. 25, located in vertical relationship within elevator well 10 so that such triggering will occur after a predetermined vertical increment of travel has been accomplished; said increments being manifestly determined by the character of the units *c* being stacked and with switch actuators 300 being adapted for positioning for accommodating the layer heights. Upon such actuation of impulse switch I-6, wiper arm 226 is moved to close the ciruit through terminal R-7 which returns pattern plate *s* to closed condition with consequent actuation of impulse switch I-7 and initiating a re-cycling of the operation as above described. Impulse switch I-7 is thus adapted for vertical travel with said elevator arms. It is to be observed that upon removal of units *c* from zone *z* safety switches *s*-1 through *s*-8 and *s*1-1 through *s*1-4 return to open condition whereby case stop plates 37 may be restored from lowered position.

In view of the foregoing layer upon layer of units *c* will be deposited on pallet *p* until the load is complete, whereupon pallet *p* will be at the lower end of elevator well 10 positioned for discharge. When said pallet *p* reaches the lower limit of its travel, it will cause normally closed limit switch LS-1 to be opened whereby the circuit through stepping switch R is opened with pattern plate *s* remaining in its opened condition.

At this point, impulse switch I-12 is concurrently actuated by a trigger member (not shown) carried on one of said elevator or lowerator arms for energizing solenoid 251 whereby wiper arm 252 of stepping switch S is moved to engagement with terminal S-1 whereupon solenoid coil 261 is energized so as to cause operation of cylinders 205, 206, and 207 for withdrawing lowerator or elevator arms 211, 212, and 213 from elevator well 10 and into the confines of module L; said arms 211, 212, and 213 being thus at the lower limit of their vertical travel. At the full extent of their retraction, arms 211, 212, and 213 will cause an impulsing of switch I-8 effecting a stepping of wiper arm 252 to terminal S-2 with cylinder 198 being operated thereby for effecting upward travel of said arms 211, 212, and 213 while retracted; such upward travel continuing until impulse switch I-9 is actuated resulting in a termination of such travel while appropriately operating cylinders 205, 206, and 207 to cause said arms 211, 212, and 213 to be extended, moving elevator well 10 into position for receiving an empty pallet *p*. The extension of said arms 211, 212, and 213 causes an actuation of impulse switch I-10 with consequent stepping of wiper arm 252 into contact with terminal S-4 with operation thereby of cylinder 152 to effect upward movement of empty pallet support arms 142,142' within pallet magazine M for presenting the uppermost pallet *p* therein in position for delivery onto said arms 211, 212, and 213.

Such upward movement of said arms 142, 142' brings about a triggering of impulse switch I-11 causing stepping switch S to be closed through wiper arm 252 and terminal S-5 which results in closing travel of pattern plate *s* through the interlock between stepping switches R and S. The light sensing element 250 is normally open by virtue of an empty volume at the upper end of pallet magazine M. However, when pallet arms 142, 142' are moved upwardly so as to present pallet p at the upper end of said magazine for engagement by pattern plate *s*, the same will block the light flow and hence close the circuit through conductor 250' to solenoid coil 244 for energizing the latter for requisite operation of cylinder 130 for pattern plate closing action. With removal of the uppermost pallet *p* from the magazine M, light sensing element 250 will be returned to open condition and with the circuit through stepping switch S being inoperative at such time.

When pallet magazine M is depleted of pallets *p* and with arms 142, 142' at the uppermost position within said magazine M, impulse switch I-15 will be triggered for causing wiper arm 268 of stepping switch T to be moved to its first position, namely, terminal T-1 for closing the circuit through conductor 273 to solenoid coil 276 for operating cylinder 152 to bring about downward travel of pallet support arms 142,142' to return same to lowermost position surfacewise aligned with delivery conveyor 14. Upon reaching the downward limit of their movement, empty pallet support arms 142,142' will actuate impulse switch I-13 causing the wiper arm 268 to move to engage terminal T-2 for energizing the hydraulic motor (not shown) for powering of conveyor 14 so as to cause a stack of empty pallets *p* to travel inwardly of magazine M for supported disposition upon said pallet arms 142,142'. The reception of the pallet stack upon said arm 142,142' will bring about a triggering of impulse switch I-14 whereby wiper arm 268 will be stepped to terminal T-3, and as the same is a deal point, stoppage of the hydraulic motor (not shown) is thereby caused so as to prevent inadvertent continuation of delivery of stacks of empty pallets to the magazine M, simultaneously through a requisite where cylinder stops 155 may be caused to elevate so as to effectively inhibit inward travel of any additional stacks.

In view of the foregoing, the relative speed of operation of machine A is apparent. It should be observed that substantial economies in time are brought about fundamentally by multiple simultaneous feeding of units to the machine with such units being readily arranged in layer formation without the necessity of row-by-row creation. It has been shown that such layers are adapted for any predetermined pattern to produce a locked load and with the said machine being extremely versatile for accommodating units of all sizes and dimensions. While a layer is being transmitted to pattern plate *s* by carriage 50, the next succeeding layer is being concurrently formed. The return movement of pattern plate *s* is a working movement in that it delivers an empty pallet to the arms 211, 212, and 213. Moreover, it is the uppermost pallet in the magazine M which is so delivered so that the same is immediately in position for unit reception without any time delay occasioned, as heretofore, by travel from the lower end of the elevator well to the upper end. Additionally, while arms 211, 212, and 213 are being returned upwardly for ultimate disposition to receive the empty pallet, a fully loaded pallet is being discharged from machine A. Consequently, the pallet loader of the present invention is so uniquely conceived and developed as to permit each operation to be effectuated without the necessity of awaiting, in an idle state, the performance of some other operation.

As indicated above, machine A is of generally modular construction so as to facilitate assembly and erection, as well as to allow for a preselected relationship of modules as may be dictated by the particular operation of the associated plant.

It is to be recognized that the foregoing does not explicitly set forth the circuitry and related means for causing the development of a suitable gap within which stop plates 37 may be elevated for arresting movement into layer-forming zone z of cartons from conveyor C in order to prevent interference with effective operation of frame 52. This application suitably implies that manual of other like means may be used for restraining travel of cartons on conveyor C to allow for such operation of stop plates 37 so that it is apparent that gap development in one manner or another is contemplated by the present invention, although the same is not restricted to a specific system.

With respect to the operation of the machine of the present invention, it is to be noted that the description of same was, necessarily, described in a sequential fashion so as to clearly disclose the precise manner of operation. However, for enhancing the rapidity with which machine A may bring about the pallet loading operation, it must be recognized that a simultaneity of various of the operations may be easily brought about through the particular circuit arrangement. Thus, a series of operations are substantially occurring concurrently, thereby accelerating the periodicity of operation. Accordingly, for example, when pattern plate s is returned over elevator well 10, with carriage 50 located within layer-forming zone z, the following operations are occurring: carriage frame 52 is lowered to engage the formed layer; carriage 50 is activated to effect forward travel of the layer and thereupon stop plates 37 are lowered so that the next succeeding layer may be formed within the zone z. Pusher bar 114 is activated for compacting the layer while the same is being transferred from zone z to pattern plate s.

Thus, when the carriage 50 delivers the layer onto pattern plate s, the latter will thereupon cause said layer to be stripped for descent onto the underlying pallet. When pattern plate s is stopped in the pallet magazine M, the lowerator assembly 156 is lowered while carriage frame 52 is being elevated; with pusher bar 114 being retracted; and carriage 50 being activated for rearward travel. When the lowerator assembly 156 lowers each layer, the pattern plate s is actuated to return over elevator well 10. Thus, by this system, pattern plate s and carriage 50 are traveling rearwardly at the same time; while lowerator assembly 156 is being lowered carriage frame 52 is being swung upwardly and pusher bar 114 is retracted thereby causing carriage 50 to clear the new layer while it travels to pick up the next layer. Lost or waiting time is substantially eliminated by the present arrangement.

Having described our invention, what we claim and desire to obtain by Letters Patent is:

1. A pallet loading machine for the stacking of layers of units upon a storage pallet comprising a main frame, means provided on said frame for defining a discrete unit-accumulation zone for receiving a layer of units to be stacked, a pattern plate presented adjacent said accumulation zone, means for slidably transferring unitarily as a layer, a layer of units from said accumulation zone to said pattern plate, means for supporting a pallet beneath said pattern plate, means for sliding said pattern plate from beneath a layer of units received thereon for depositing the latter upon a pallet supported by said pallet support means, said means for supporting a pallet beneath said pattern plate comprising a plurality of horizontally aligned arms, lowering means for causing said arms to descend in pallet supporting condition from a position beneath said pattern plate to lowered position downwardly remote therefrom, means for retracting said arms from the supported pallet when said arms are in lowered position, conveying means for receiving said pallet from said arms and transferring same from the machine, elevating means for returning said arms upwardly while in retracted condition and during conveyance of the supported pallet from the machine, said main frame comprising means defining an empty pallet magazine, elevator means within said magazine for supporting a stack of empty pallets therein, means provided in said empty pallet magazine for receiving said pattern plate when the same is withdrawn from beneath a layer of units for depositing same upon a pallet, means for operating said elevator means to present the uppermost empty pallet for engagement by said pattern plate after a layer of units has been withdrawn therefrom, pallet engaging means on said pattern plate for transferring the uppermost empty pallet to said pallet support arms, timing means for effecting upward travel of said empty pallet magazine elevator while said pallet support arms are being moved upwardly so that when the same are returned to pallet support position said pattern plate will deliver the erstwhile empty pallet to said arms, and means for causing descent of said elevator means within said magazine when the same is depleted of pallets.

2. A pallet loading machine for the stacking of layers of units of rectangular configuration upon a storage pallet comprising a main frame, means provided on said frame for defining a discrete unit-accumulation zone for receiving a layer of units to be stacked, a pattern plate presented adjacent said accumulation zone, means for feeding simultaneously a plurality of units in side-by-side relationship to said accumulation zone comprising a conveyor, means for partitioning said conveyor to create a plurality of side-by-side channels, means for adjusting said partition means to create channels of different transverse extent whereby preselected channels may accommodate units turned at an angle of 90 degrees to units being conveyed through other channels, said conveyor channels communicating with said accumulation zone for delivering a locked layer of units thereto, means for limiting the feeding of said units to the accumulation zone when a layer thereof has been established comprising stop plates mounted on said main frame between the ends of said conveyor channels and said accumulation zone, means for effecting controlled vertical movement of said stop plates between channel-closed and channel-opened condition whereby certain channels may remain open for a longer period than others commensurate with the pattern of the locked layer to be formed, means slidably transferring unitarily as a layer, a layer of units from said accumulation zone to said pattern plate, means for supporting a pallet beneath said pattern plate, means for sliding said pattern plate from beneath a layer of units received thereon for depositing the latter upon a pallet supported by said pallet support means.

3. A pallet loading machine as defined in claim 2 and further characterized by switch means provided in said accumulation zone engageable by units transferred thereto, said means for effecting a vertical movement of said stop plates being operatively connected to said switches whereby upon actuation of said switches said stop plates will be elevated.

* * * * *